US012624734B2

(12) United States Patent
Finn et al.

(10) Patent No.: US 12,624,734 B2
(45) Date of Patent: *May 12, 2026

(54) SHIFT SYSTEM AND METHOD FOR POWER TRANSMISSION ASSEMBLY

(71) Applicant: Means Industries, Inc., Saginaw, MI (US)

(72) Inventors: Dustin Finn, Essexville, MI (US); John Jennings, West Bloomfield, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/037,182

(22) Filed: Jan. 25, 2025

(65) Prior Publication Data

US 2025/0172176 A1 May 29, 2025

Related U.S. Application Data

(63) Continuation of application No. 18/674,857, filed on May 25, 2024, now Pat. No. 12,209,623.

(60) Provisional application No. 63/468,586, filed on May 24, 2023.

(51) Int. Cl.
| | |
|---|---|
| *F16D 41/12* | (2006.01) |
| *F16D 41/16* | (2006.01) |
| *F16H 3/12* | (2006.01) |
| F16D 27/108 | (2006.01) |

(Continued)

(52) U.S. Cl.
CPC ........... *F16D 41/125* (2013.01); *F16D 41/16* (2013.01); *F16H 3/126* (2013.01); *F16D 27/108* (2013.01); *F16D 2500/10493* (2013.01); *F16D 2500/30415* (2013.01); *F16D* 2500/50638 (2013.01); *F16D 2500/7041* (2013.01); *F16H 3/089* (2013.01); *F16H 2063/3046* (2013.01)

(58) Field of Classification Search
CPC ...... F16D 41/125; F16D 41/16; F16D 27/108; F16D 48/064; F16D 2500/30415; F16D 2500/7041; F16H 3/089; F16H 3/126; F16H 2063/3046; F16H 2061/2853; F16H 2061/2861; F16H 61/32
See application file for complete search history.

(56) References Cited

U.S. PATENT DOCUMENTS

| | | | |
|---|---|---|---|
| 4,222,473 | A | 9/1980 | Kopich |
| 5,531,651 | A | 7/1996 | Yang |
| 5,927,455 | A | 7/1999 | Baker et al. |

(Continued)

FOREIGN PATENT DOCUMENTS

| | | | | | |
|---|---|---|---|---|---|
| DE | 102019114139 | B3 | * | 6/2020 | ............... F16H 3/54 |
| JP | 201974177 | A | | 5/2019 | |

*Primary Examiner* — Timothy Hannon

(74) *Attorney, Agent, or Firm* — Burgess Law Office, PLLC

(57) ABSTRACT

A method for power transmission method includes providing first and second shafts, a gear assembly having first and second gear ratios, and first and second coupling assemblies. The first coupling assembly enabling torque transfer from the first shaft to the second shaft, and the second coupling assembly enabling torque transfer from the first shaft to the second shaft. The speed of the first shaft varies, wherein the deployment of a locking element of the second coupling assembly is based on the speed of the first shaft.

35 Claims, 30 Drawing Sheets

(51) Int. Cl.
*F16H 3/089* (2006.01)
*F16H 63/30* (2006.01)

(56) References Cited

U.S. PATENT DOCUMENTS

| | | | |
|---|---|---|---|
| 6,244,965 B1 | 6/2001 | Klecker et al. | |
| 6,290,044 B1 * | 9/2001 | Burgman | F16D 41/125 |
| | | | 192/85.48 |
| 7,258,214 B2 | 8/2007 | Pawley et al. | |
| 7,344,010 B2 | 3/2008 | Fetting, Jr. et al. | |
| 7,484,605 B2 | 2/2009 | Pawley et al. | |
| 8,226,517 B2 | 7/2012 | Tsai | |
| 8,418,585 B2 | 4/2013 | Yang | |
| 8,888,637 B2 | 11/2014 | Kimes | |
| 9,186,977 B2 | 11/2015 | Kimes | |
| 9,933,049 B2 | 4/2018 | Kimes | |
| 11,788,586 B1 | 10/2023 | Davis et al. | |
| 12,013,017 B2 | 6/2024 | Hand | |
| 12,209,623 B2 * | 1/2025 | Finn | F16H 3/126 |
| 2003/0188947 A1 | 10/2003 | Fitz et al. | |
| 2007/0278061 A1 | 12/2007 | Wittkopp | |
| 2010/0025238 A1 | 2/2010 | Gottlieb et al. | |
| 2015/0000442 A1 | 1/2015 | Kimes et al. | |
| 2015/0211587 A1 | 7/2015 | Kimes et al. | |
| 2015/0276020 A1 | 10/2015 | Yoon | |
| 2016/0047439 A1 | 2/2016 | Kimes | |
| 2016/0131205 A1 | 5/2016 | Essenmacher | |
| 2018/0045306 A1 | 2/2018 | Eisengruber | |
| 2018/0094676 A1 | 4/2018 | Campton et al. | |
| 2018/0156332 A1 | 6/2018 | Kimes | |
| 2018/0347642 A1 | 12/2018 | Kimes | |
| 2019/0170198 A1 | 6/2019 | Kimes | |
| 2019/0170199 A1 | 6/2019 | Kurosaki et al. | |
| 2019/0264760 A1 | 8/2019 | Peglowski et al. | |
| 2023/0141381 A1 | 5/2023 | Voelker | |

* cited by examiner

SHIFT SYSTEM AND METHOD FOR POWER TRANSMISSION ASSEMBLY

CROSS-REFERENCE TO RELATED APPLICATIONS

This application is a continuation of U.S. patent application Ser. No. 18/674,857 filed on May 25, 2024, which claims the benefit of U.S. Provisional Application No. 63/468,586, filed May 24, 2023. The disclosure of the above application(s) are incorporated herein by reference.

BACKGROUND OF THE INVENTION

1. Field of the Invention

The invention generally relates to a vehicle power train; and, more specifically, a power train using a shift system including a one-way clutch.

2. Description of Related Art

In the field of automotive technology, vehicle powertrains typically include shift systems using multiple friction clutch elements. Automatic transmissions (AT) use wet friction clutches, dual-clutch transmissions (DCT) use wet & dry friction clutches, and manual transmission (MT) and automated manual transmissions (AMT) use synchronizers, friction cone clutches, and a shift collar.

Other shift mechanisms use various elements of the above or in combination with a mechanical dog clutch, shift collar, or sliding sleeve.

Friction clutches add drag, reduce efficiency, and reduce electric vehicle range. They also create heat, wear, and contamination that can lead to other failure modes. Friction clutches require hydraulics, fluids, pumps, and hydraulic distribution. This adds weight, complexity, possibility of leaks and generates heat.

Elimination of friction clutches also addresses an industry need to support sustainability and circular economy objectives and targets. Friction clutches wear, need replacing, and cannot be reused, repurposed, or easily recycled. Additionally, friction clutch inefficiencies constitute a significant source of heat generation.

Battery electric vehicle drive systems include thermal management issues related to heat generation.

Existing powertrains often use electric motors and controllable or selectable coupling assemblies, such as one-way clutches. These coupling assemblies can be electromagnetically operated and magnetically controlled. Various types of selectable one-way clutches, including those using a selector plate, a solenoid, and a linear actuator, are known. The foregoing are examples of one-way clutches that may be used in the clutch system disclosed herein.

SUMMARY OF THE INVENTION

A method for power transmission includes providing a first shaft, the first shaft rotatable at a variable rotation speed, a second shaft, the second shaft rotatable at a variable rotation speed, a gear assembly between the first shaft and the second shaft, the gear assembly including at least a first gear ratio and a second gear ratio. The method also includes providing a first coupling assembly enabling torque transfer from the first shaft to the second shaft, the first coupling assembly including a notch plate, a pocket plate, and a locking element in a deployed position, and a second coupling assembly enabling torque transfer from the first shaft to the second shaft, the second coupling assembly including a notch plate, a pocket plate, and a locking element movable between a deployed and nondeployed position. The speed of the first shaft varies, wherein the deployment of a locking element of the second coupling assembly is based on the speed of the first shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or its uses.

Figure 1:
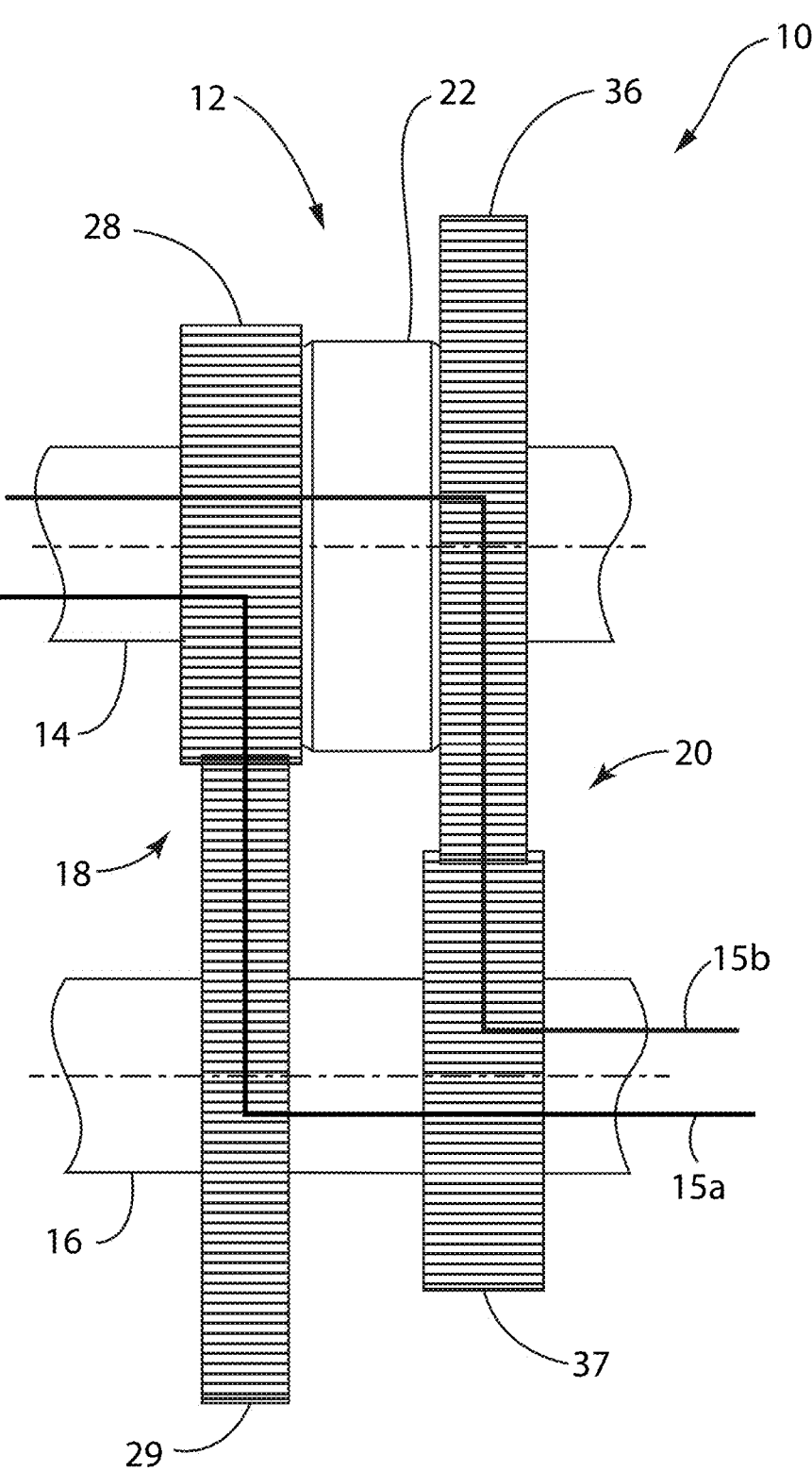
FIG. 1 is a schematic illustration and overview of a multi-speed transmission, including a shift system according to one example of the power transmission system of the present invention.

FIG. 1 schematically illustrates one example of a power transmission system or assembly 10, including a shift system 12. The power transmission system or assembly 10 functions as a torque-transmitting mechanism between respective components.

The power transmission system or assembly 10 includes a first or driving shaft 14 and a second or driven shaft 16. The first or driving shaft 14 receives input from a power source, for example, an electric motor. The second or driven shaft 16 provides an output from the power transmission system or assembly 10 to a driven member, for example, a drive unit associated with one or more vehicle wheels. Both the first and second shafts 14, 16 rotate at variable rotation speeds. When used with a hybrid or electric vehicle in a regeneration mode, torque supplied from the second or driven shaft 16, from a vehicle wheel, acts through the power transmission system or assembly 10 to provide torque to the first or driving shaft 14 and ultimately to the motor.

In one example, the power transmission system or assembly 10 includes a $1^{st}$ gear assembly/ratio 18 and a $2^{nd}$ gear assembly/ratio 20. The shift system 12 selects either the $1^{st}$ gear assembly/ratio 18 or the $2^{nd}$ gear assembly/ratio 20 by connecting a respective gear to the first or driving shaft 14. Selecting the different gear ratios changes the speed and torque. It provides two power or torque paths 15a, 15b, one through the $1^{st}$ gear assembly/ratio 18 and a second through the $2^{nd}$ gear assembly/ratio 20. In one example, the shift system 12 includes one-way clutches.

A one-way clutch produces a mechanical connection. A one-way clutch may be passive. A passive one-way or overrunning clutch always produces a drive connection or engaged state and transfers torque between components when their relative rotation is in one direction, overruns when relative rotation is in the opposite direction, and overruns when their relative rotation is in the same direction and the driven member rotates faster than the drive member. The passive one-way or overrunning clutch overruns when the drive or input member rotates slower than the driven or output member. The direction of driving and overrunning in the opposite direction depends upon the direction of rotation of the driving member.

One example of a passive one-way clutch or passive strut assembly includes a passive or uncontrolled locking element, for example, a strut, disposed in the pocket of a pocket plate. A resilient member or spring continuously biases the strut outward of the pocket in the pocket plate—the strut is continuously deployed. The one-way clutch is passive because the strut is not controlled. The strut is constantly biased outward of the pocket and past a side face or surface of the first coupling member or pocket plate. The resilient member or spring constantly urges the strut out of the pocket to a deployed position, wherein the strut extends out of the pocket in the first coupling member or pocket plate. In the outward position, the locking element engages the second coupling member, for example, engages a notch in a notch plate. The one-way clutch prevents rotation of the second coupling member or notch plate in one direction of rotation and allows overrun; that is, the second coupling member or notch plate rotates freely in the opposite direction. The one-way clutch passively controls torque in one direction and overruns in the opposite direction.

A one-way clutch may be a selectable or controllable one-way clutch; the state of the one-way clutch, activated or deactivated-deployed or nondeployed, can be selected or controlled. A selectable or controllable one-way clutch may also be referred to as an active one-way clutch. A selectable or controllable one-way clutch in a nondeployed condition allows overrun in both directions and may function like a passive one-way clutch when deployed. Hence, a selectable or controllable one-way clutch is active; the state of the locking element, deployed or nondeployed, can be controlled. A selectable or controllable one-way clutch may also be passive because the locking element, when deployed, can be overrun.

A selectable or controllable one-way clutch typically includes a control mechanism or actuator that activates or deactivates the one-way clutch to enable or disable a drive connection or engaged state between components. A selectable or controllable one-way clutch may include locking elements combined with an actuator and/or selector mechanism. The selector mechanism is operative to control the deployment of the locking element. When deployed the locking element selectively mechanically couples the associated components. For example, a selectable or controllable one-way clutch is active because the locking element in the pocket plate may move between a nondeployed position—the locking element in the pocket of the pocket plate and a deployed position—the locking element extending outwardly from the pocket of the pocket plate and beyond or past the face or side surface of the pocket plate. In the deployed position, the locking element engages the second coupling member or notch plate, wherein the one-way clutch passively locks in one direction of rotation and freely rotates or overruns in the opposite direction. The locking elements, actuator, and/or selector add multiple functions to the one-way clutch, including implementing the different operating modes. When deactivated the active one-way clutch produces no drive connection or engaged state between the components and transfers no torque. When activated the active one-way clutch produces a drive connection or engaged state, transfers torque between components when their relative rotation is in one direction, and overruns in the same manner as the passive one-way or overrunning clutch. An active one-way clutch may not engage and may operate passively when placed in an activated position. Even though the active one-way clutch is activated, depending on the relative movement of the components, it may not actively engage and will not produce a drive connection or engaged state. However, because it is in an activated position, it will engage and transfer torque based on the relative movement of the components.

A dynamically controllable clutch refers to a controllable or selectable, active one-way clutch acting between two rotating components, for example, one where both races are rotatable. An overrunning dynamically controllable clutch refers to a controllable or selectable active one-way clutch acting between two rotating components; for example, one where both races are rotatable and capable of overrunning when deployed.

The power transmission system or assembly 10 provides a shift technology meeting vehicle performance needs, for example, smooth shifting and improved hybrid or electric vehicle efficiency and range. In one example, the power transmission system or assembly 10 provides a mechanical locking element shift system, including a passive one-way clutch and an active one-way clutch. Using the one-way clutches as an upshift and downshift transition aid provides for less complex control strategies. Less complex controls equal less development cost and fewer potential failure modes.

The power transmission system or assembly 10 is notably suitable for use with an electric vehicle or electric motor. The system or assembly 10 takes advantage of the precise control and efficiency of a variable-speed motor, including the ability to change or vary motor speed in a short period. For example, an electric motor typically used for electric vehicles may transition from 1500 rpm to 2000 rpm in milliseconds. While the power transmission system or assembly 10, including the shift system 12, takes advantage of electric motor operating parameters, it is not limited to use with an electric motor.

FIGS. 2-4B schematically illustrate one example of the shift system 12 using a coupling mechanism, generally seen at 22, positioned between the $1^{st}$ gear assembly/ratio 18 ($1^{st}$ gear node) and the $2^{nd}$ gear assembly/ratio 20 ($2^{nd}$ gear node). The coupling mechanism 22 includes a passive one-way clutch or coupling assembly 21 and a first controllable one-way clutch or coupling assembly 23, both operative to connect the first shaft 14 to the second shaft 16 at the $1^{st}$ gear assembly/ratio 18. The coupling mechanism 22 further includes a second and third controllable one-way clutch or coupling assembly 31, 33 operative to connect the first shaft 14 to the second shaft 16 at the $2^{nd}$ gear assembly/ratio 20. Gear ratios represent the gears' relation to each other in size. When different-sized gears mesh, they can spin at different speeds and deliver different amounts of torque and speed. For example, engaging $1^{st}$ gear delivers low speed but high torque.

The $1^{st}$ gear assembly/ratio 18 includes two rotating races, i.e., a first coupling member in the form of a pocket plate 24 and a second coupling member in the form of a notch plate 26. The pocket plate 24 is fixedly connected to the first shaft 14 of the power transmission system or assembly 10, and the notch plate 26 forms part of or is fixedly connected to a gear 28 of the $1^{st}$ gear assembly/ratio 18. The gear 28 is rotatably supported by a bearing 17 on the first shaft 14 for relative rotation on the shaft 14.

The pocket plate 24 contains first and second sets of locking elements 30A, 30B for clockwise ("CW") and counterclockwise ("CCW") engagement, respectively. During engagement, at least one set of the locking elements 30A, 30B contact the pocket and notch engagement faces of the pocket and notch plates 24, 26, connecting the pocket and notch plates 24, 26 together. The pocket and notch plates 24, 26 connect the first shaft 14 and the gear 28 of the $1^{st}$ gear assembly/ratio 18. The locking elements 30A, 30B transmit torque between the first shaft 14 and the gear 28, which are connected via the connected pocket and notch plates 24, 26.

Similar to the $1^{st}$ gear assembly/ratio 18, the $2^{nd}$ gear assembly/ratio 20 also includes two rotating races, i.e., a first coupling member in the form of a pocket plate 32 and a second coupling member in the form of a notch plate 34. The pocket plate 32 is fixedly connected to the first shaft 14 of the power transmission system or assembly 10. The notch plate 34 forms part of or is fixedly connected to a gear 36 of the $2^{nd}$ gear assembly/ratio 20. The gear 36 rotatably supported on the first shaft 14 by a bearing 19 for relative rotation on the shaft 14.

The pocket plate 32 contains first and second sets of locking elements 38A, 38B for clockwise ("CW") and counterclockwise ("CCW") engagement, respectively. During engagement, at least one of the sets of locking elements 38A, 38B contacts the pocket and notch engagement faces of the pocket and notch plates 32, 34, connecting the pocket and notch plates 32, 34 together. The pocket and notch plates 32, 34 connect the first shaft 14 and the gear 36 of the $2^{nd}$ gear assembly/ratio 20. The locking elements 38A, 38B transmit torque between the first shaft 14 and the gear 36, which are connected via the connected pocket and notch plates 32, 34.

In one example, the coupling mechanism 22 includes an actuator in the form of a linear motor or linear actuator, generally seen at 40. The actuator 40 may be a three-position actuator, with the stator 42 having three induction coils 46.

The actuator 40 includes a stator 42 and a translator 44. For example, the stator 42 is fixed in position to a housing (not shown). The stator 42 includes induction coils 46 housed between steel plates 48.

The translator 30 includes an annular ring of segmented permanent magnets 50 and steel plates 52. The translator 44 connects to and rotates with the first shaft 14 and moves linearly between lateral, axial positions. The linear actuator 40 actively controls an operating mode of the shift system 12 by generating an electromagnetic force with the stator 42 that interacts with the translator 44, causing the translator to slide, move back and forth, axially on the first shaft 14.

The actuator 40 includes a first radially extending actuation or spring plate 54 associated with the $1^{st}$ gear assembly/ratio 18 and a second radially extending actuation or spring plate 56 associated with the $2^{nd}$ gear assembly/ratio 20. The first spring plate 54 acts on an actuation member, shown as a spring 58B, and the second spring plate 56 acts on actuation members, shown as springs 60A, 60B. In the disclosed example, the first spring plate 54 is associated with the first controllable one-way clutch or coupling assembly 23, and the second spring plate 56 is associated with the second and third controllable one-way clutches or coupling assemblies 31, 33 wherein axial movement of translator 44 correspondingly moves the spring plates 54, 56. The spring plate 54 applies a force to the spring 58B, wherein the spring 58B acts on locking element 30B. The spring plate 56 applies a force to the springs 60A, 60B, wherein the springs 60A, 60B act on the respective locking elements 38A, 38B. In one example, the springs 58B, 60A, 60B are coiled springs received within the respective passageways 62B, 64A, 64B to provide an actuating force to move the locking elements 30B, 38A, 38B between their engaged, deployed, and disengaged, nondeployed positions. Other actuators or actuation members besides springs may provide the actuating forces. Also, pressurized fluid may provide the actuating forces. In addition to a linear actuator, a cam actuator or a linear member with a shift fork may move the spring plates 54, 56 and the corresponding springs 58B, 60A, 60B. In the present example, the three-position actuator 40 does not act on the locking element 30A. The locking element 30A is passive, not actively controlled. An actuation spring 58A in a blind bore 62A continuously acts on the locking element 30A to bias it out of the pocket 24A of the pocket plate 24 to an engaged or deployed position.

Biasing member or return springs 59, 61A, 61B located under respective locking elements 30B, 38A, 38B are compressed when the locking elements 30B, 38A, 38B are deployed. When the translator 30 moves to reposition the locking elements 30B, 38A, 38B to a nondeployed position, the biasing members or return springs 59, 61A, 61B bias, exert a force on the locking elements 30B, 38A, 38B, overcoming the reduced force of the actuation members or springs 58B, 60A, 60B and moving the locking elements 30B, 38A, 38B towards their nondeployed positions. Each pocket 24B, 34A, 34B has an inner recess for receiving its respective biasing members or springs 59, 61A, 61B. The biasing members or return springs 59, 61A, 61B create a force, causing the locking elements 30B, 38A, 38B to pitch downward to a nondeployed position.

The shift system 12 includes the passive clutch or coupling assembly 21 associated with the $1^{st}$ gear assembly/ratio 18, a first controllable one-way clutch or coupling assembly 23 associated with the $1^{st}$ gear assembly/ratio 18, and second and third controllable one-way clutches or coupling assemblies 31, 33 associated with the $2^{nd}$ gear assembly/ratio 20. The passive clutch or coupling assembly 21 includes the locking element 30A. The locking element 30A transmits torque from the first shaft 14 to the gear 28 in the clockwise direction. The first controllable one-way clutch or coupling assembly 23 includes the locking element 30B. The locking element 30B transmits torque from the first shaft 14 to the gear 28 in the counterclockwise direction. The second controllable one-way clutch or coupling assembly 31 includes the locking elements 38A, and the third controllable one-way clutch or coupling assembly 33 includes the locking elements 38B. The locking element 38A transmits torque from the first shaft 14 to the gear 36 in the clockwise direction. The locking element 38B transmits torque from the first shaft 14 to the gear 36 in the counterclockwise direction. As used herein, the clockwise rotation of the first shaft 14 is associated with forward torque or forward vehicle motion, and the counterclockwise rotation of the first shaft 14 is associated with reverse torque, both reverse vehicle motion and forward regeneration torque.

The locking elements 30A, 30B of the passive clutch or coupling assembly 21 and the first controllable one-way clutch or coupling assembly 23 are separate one-way clutch locking elements.

The passive one-way clutch or coupling assembly 21 includes a passive or uncontrolled locking element, for example, the locking element 30A, in a pocket 24A of the pocket plate 24. The locking element 30A and pocket plate 24 associated with the passive one-way clutch are mounted on the first shaft 14, wherein the locking element 30A in the pocket 24A of the pocket plate 24 rotates with the first shaft 14. Because the locking element 30A is passive, the locking element 30A is continuously biased out of the pocket 32A, toward the engaged or deployed position and remains so regardless of the position of the translator 44. The locking element 30A associated with the passive one-way clutch or coupling assembly 21 is passive because the locking element 30A is not controlled. Depending on the direction and speed of rotation of the components, the locking element 30A of the passive one-way clutch or coupling assembly 21 either engages or overruns. In one direction, it engages, and in the other, it overruns. It also overruns when their relative rotation is in the same direction, and the driven member, for example, the notch plate 26, rotates faster than the drive member, the pocket plate 24. In an overrun condition the components may turn freely in at least one direction with respect to one another.

The first controllable one-way clutch or coupling assembly 23 includes a controlled locking element, for example, the locking element 30B. The actuator 40 moves the locking element 30B in the pocket 24B of the pocket plate 24 of the first controllable one-way clutch or coupling assembly 23 between a disengaged or nondeployed position, wherein the locking element 30B is in the pocket 24B, in an engaged or deployed position, wherein the locking element 30B extends out of the pocket 24B. In the engaged or deployed position, the locking element 30B engages a notch 26B in the notch plate 26 of the first controllable one-way clutch or coupling assembly 23.

The locking element 30A, coupled with the pocket plate 24 and notch plate 26, operates as a passive one-way clutch. The passive one-way clutch or coupling assembly 21 is used for 1$^{st}$ gear torque. As the first shaft 14 rotates clockwise, the locking element 30A engages, coupling the gear 28 to the first shaft 14 in the clockwise direction and correspondingly rotates the gear 28 clockwise, imparting motion to the second shaft 16. The first controllable one-way clutch or coupling assembly 23 includes the locking element 30B. The locking element 30A of the passive one-way clutch or coupling assembly 21 transmits torque through the 1$^{st}$ gear assembly/ratio 18 in a forward direction. The locking element 30B of the first controlled one-way clutch or coupling assembly 23 transmits reverse torque and regenerative torque through the first gear assembly/ratio 18.

The second and third controllable one-way clutches or coupling assemblies 31, 33 have respective controlled locking elements 38A, 38B. For example, the second controllable one-way clutch or coupling assembly 31 includes locking element 38A, and the third controllable one-way clutch or coupling assembly 33 includes the other locking element 38B. Both controllable one-way clutches or coupling assemblies 31, 33 operate similarly. For example, the actuator 40 moves one or both of the locking members 38A, 38B in the pockets 32A, 32B of the pocket plate 32 of the second and third controllable one-way clutches or coupling assemblies 31, 33 between a disengaged or nondeployed position, wherein the locking member 38A, 38B is in its respective pocket 32A, 32B, and an engaged or deployed position, wherein the locking element 38A, 38B extends out of its respective pocket 32A, 32B. In the engaged or deployed position, the locking element 38A, 38B engages a corresponding notch 34A, 34B in the notch plate 34 of the second controllable one-way clutch or coupling assembly 31. The actuator 40 controls the movement of the locking members 38A, 38B of the second and third controllable one-way clutches or coupling assemblies 31, 33 between a deployed, engaged, or locked position and a nondeployed, disengaged, or unlocked position.

The second and third controllable one-way clutches or coupling assemblies 31, 33 are associated with 2$^{nd}$ gear torque. As the first shaft 14 rotates clockwise, the locking element 38A engages, coupling the gear 36 to the first shaft 14 in the clockwise direction and correspondingly rotates the gear 36 clockwise, imparting motion to the second shaft 16. As the first shaft 14 rotates counterclockwise, the locking element 38B engages, coupling the gear 36 to the first shaft 14 in the counterclockwise direction and correspondingly rotates the gear 36 counterclockwise, imparting motion to the second shaft 16. The second and third controllable one-way clutches or coupling assemblies 31, 33 transmit forward, reverse, and regenerative torque. Forward torque results from rotating the first shaft 14 in the clockwise direction, with the corresponding gear 36 also rotated in the clockwise direction. Reverse torque results from rotating the first shaft 14 in the opposite or counterclockwise direction, with the corresponding gear 36 also rotated in the counterclockwise direction.

The actuator 40 is a three-position actuator that moves between three positions, represented by the letters A, B, and C, and acts on the first, second, and third controllable one-way clutches or coupling assemblies 23, 31, 33. Depending on the selected position, the locking elements 30B, 38A, 38B of the controllable one-way clutches of the first, second, and third controllable one-way clutches or coupling assemblies 23, 31, 33 are engaged/deployed or disengaged/nondeployed. The locking element 30A of the passive one-way clutch or coupling assembly 21 is always in an engaged/deployed position.

Figures 2, 2A, 2B:
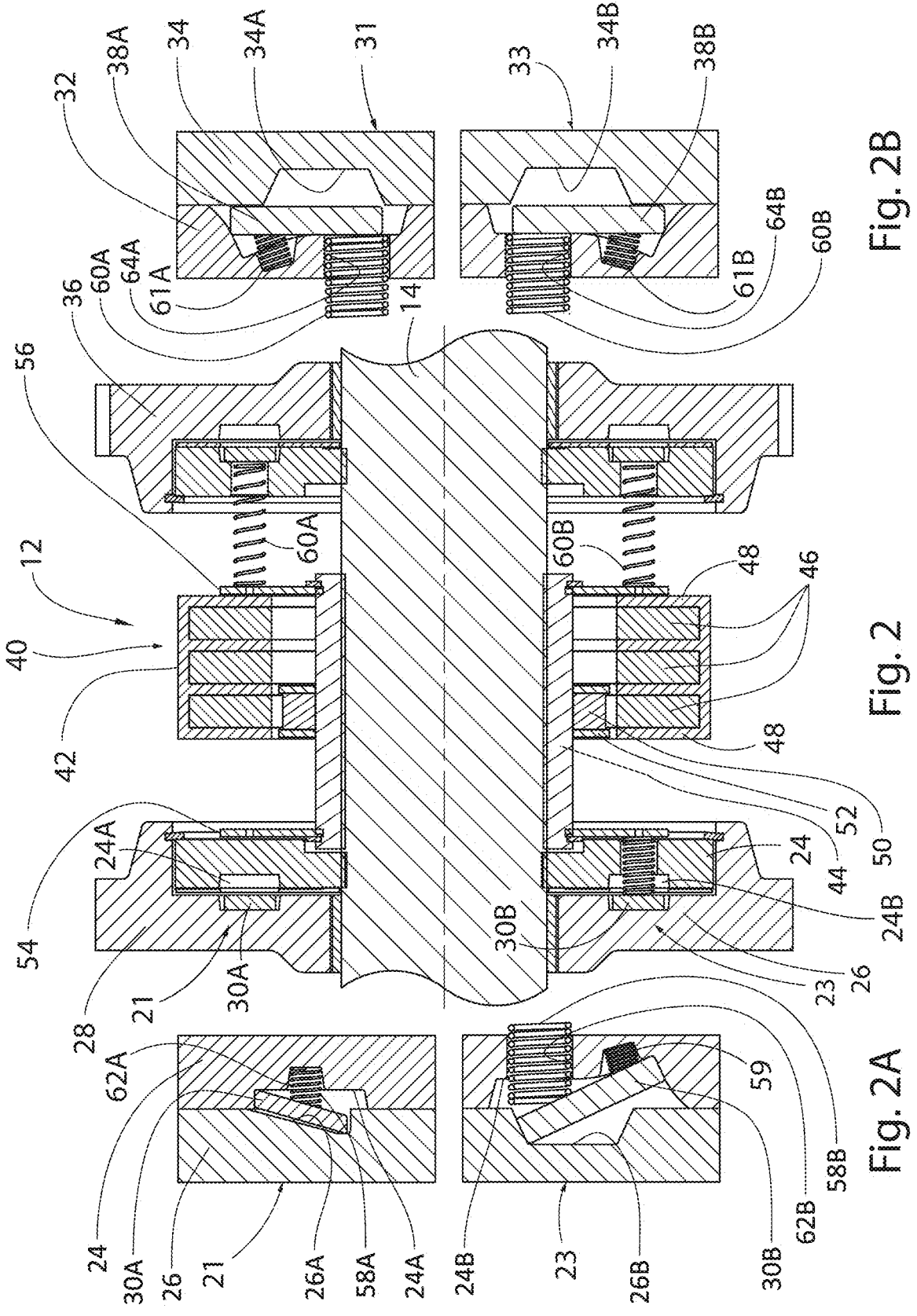
FIG. 2 is a schematic cross-sectional view illustrating one example of a shift system and mechanism for use with the power transmission system of FIG. 1, including an actuator in one position.
FIGS. 2A and 2B are exploded, cross-sectional views illustrating locking element positions for the actuator position of FIG. 2.

As shown in FIGS. 2, 2A, and 2B with the actuator 40 in the first position-Position A, associated with the far-left set of induction coils 46 of the actuator 40, the locking element 30A of the passive one-way clutch or coupling assembly 21 is engaged/deployed and transmits torque in the first or clockwise direction to the gear 28. The locking element 30B of the first controllable one-way clutch or coupling assembly 23 is also engaged/deployed and transmits torque in the counterclockwise direction to the gear 28. The locking elements 38A, 38B of the controllable one-way clutches of the second controllable one-way clutches or coupling assemblies 31 are disengaged/nondeployed and transmit no torque in either direction to the gear 36, the gear 36 freewheels on the first shaft 14. In the first position-Position A, torque is transferred for forward propulsion, regenerative braking, and 1$^{st}$ gear reverse.

Figures 3, 3A, 3B:
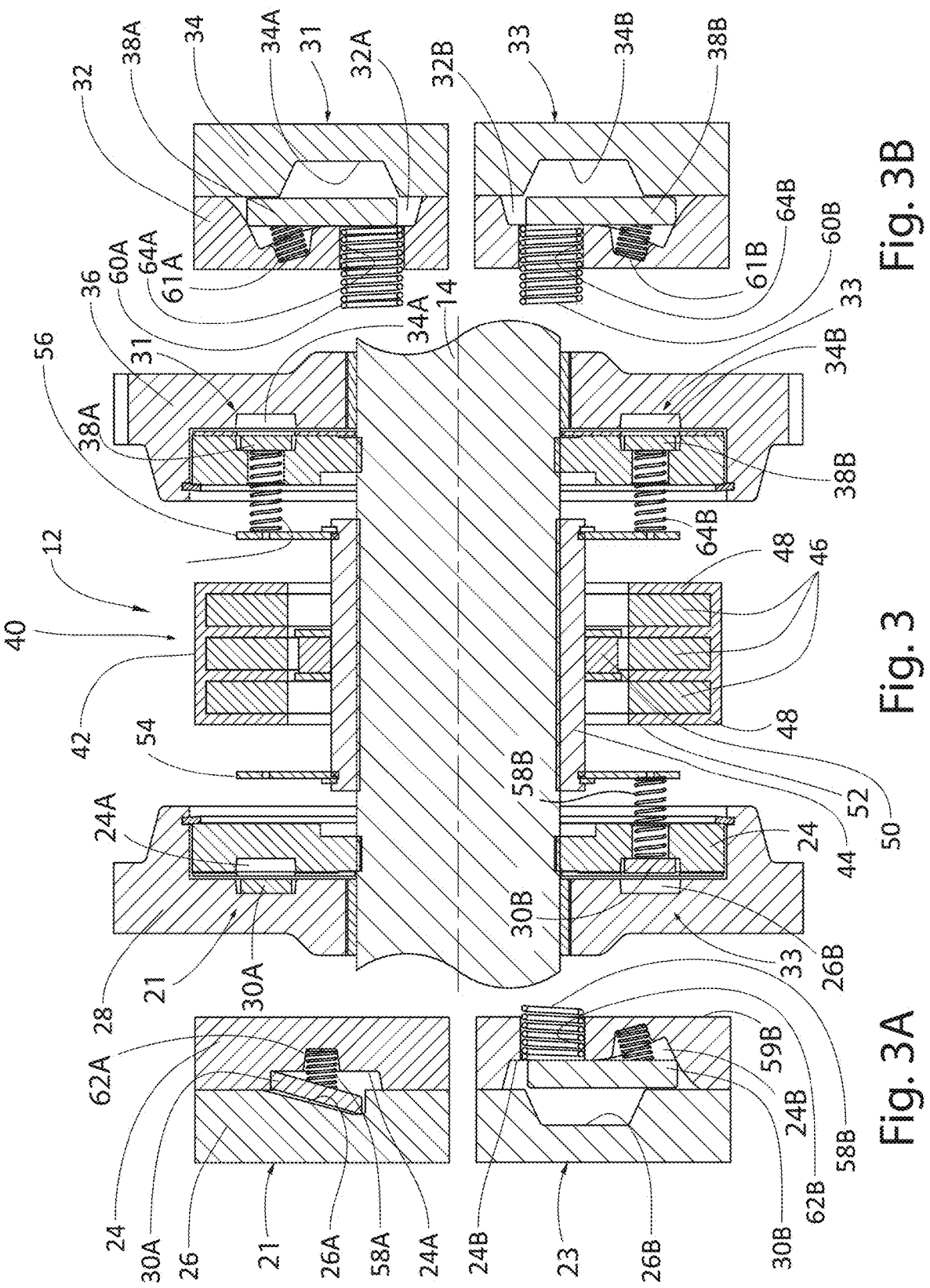
FIG. 3 is a schematic cross-sectional view illustrating one example of the shift system for use with the power transmission system of FIG. 1, including an actuator in another position.
FIGS. 3A and 3B are exploded, cross-sectional views illustrating locking element positions for the actuator position of FIG. 3.

As shown in FIGS. 3, 3A, and 3B, with the actuator 40 in the second position—Position B, associated with the second or middle set of induction coils 46 of the actuator 40, the passive one-way clutch or coupling assembly 21 remains deployed, wherein the locking element 30A remains engaged/deployed and can, depending upon motor and first shaft 14 speed engage the notch 26A on the notch plate 26 and transmit torque in the clockwise or forward direction. The locking element 30B of the first controllable one-way clutch coupling assembly 23 moves to a disengaged/nondeployed position and remains in the pocket 24B of the pocket plate 24, wherein no torque is transferred in the counterclockwise direction. The locking element 30A of the passive one-way clutch or coupling assembly 21 remains in an overrun state. Depending upon the relative rotational speed of the components, in the second position, the passive one-way clutch or coupling assembly 21 transmits torque in one direction and overruns in the opposite; for example, if the gear 28 is rotating in the clockwise direction faster than the rotational speed of the first shaft 14. In the second position, the locking elements 38A, 38B of the second controllable one-way clutch or coupling assembly 31 remain disengaged/nondeployed, wherein the gear 36 freewheels with respect to the first shaft 14.

Figures 4, 4A, 4B:
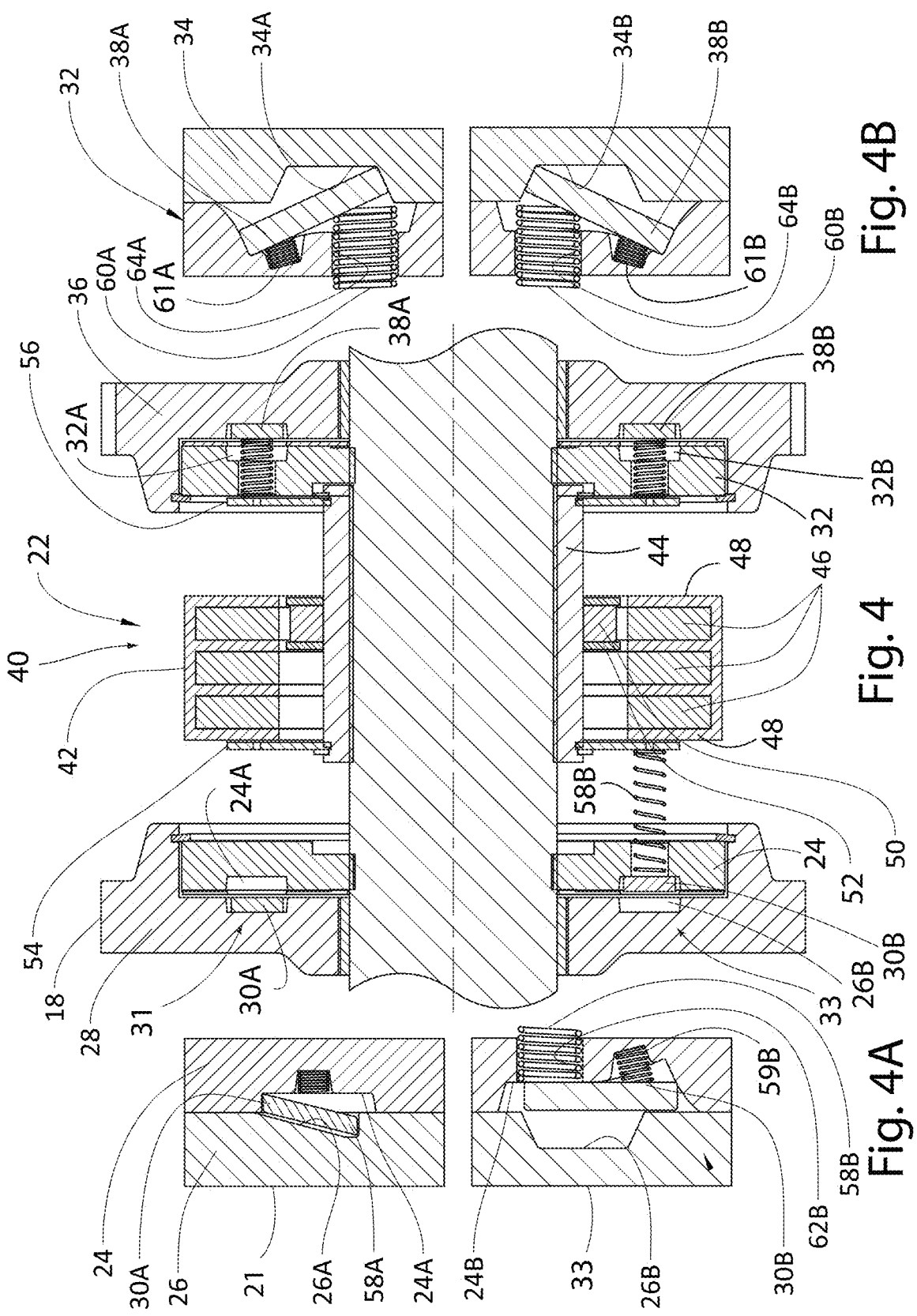
FIG. 4 is a schematic cross-sectional view illustrating the shift system for use with the power transmission system of FIG. 1, including the actuator in yet another position.
FIGS. 4A and 4B are exploded, cross-sectional views illustrating locking element positions for the actuator position of FIG. 4.

As shown in FIGS. 4, 4A, and 4B, with the actuator 40 in the third position—Position C, associated with the far-right set of induction coils 46 of the linear actuator 40, In the third position—Position C, the locking elements 38A, 38B of the controllable one-way clutches of the second and third controllable one-way clutch or coupling assembly 31, 33 are engaged/deployed and extend out of their respective pockets 32A, 32B in the pocket plate 32 and engage corresponding notches 34A, 34B in the notch plate 34 thereby coupling the gear 36 to the first shaft 14. In the third position, the second and third controllable one-way clutches or coupling assemblies 31, 33 transfer torque in both the forward and reverse directions for both forward propulsion, regenerative braking, and, if needed or desired, 2$^{nd}$ gear reverse propulsion. In the third position, the locking element 30A of the passive one-way clutch or coupling assembly 21 is still biased out of pocket 24A of pocket 24; however, it is in a constant overrun condition. The gear 29 on the second shaft 16 rotates the gear 28 at a higher speed than the speed of the first shaft 14. As long as the locking element 38A of the second controllable one-way or coupling assembly 31 is engaged, the gear 28 will always overrun the locking element 30A of the passive one-way clutch or coupling assembly 21. The locking element 30B of the first controllable one-way clutch or assembly 23 is in the disengaged/nondeployed position and transmits no torque.

The 1$^{st}$ gear assembly/ratio 18 uses the passive one-way clutch or coupling assembly 21 to transmit 1$^{st}$ gear forward torque, and the first controllable one-way clutch or coupling assembly 23 to transmit 1$^{st}$ gear regenerative and reverse torque. The 2$^{nd}$ gear assembly uses the second and third controllable one-way clutches or coupling assemblies 31, 33 to transmit 2$^{nd}$ gear forward torque, regenerative torque, or reverse torque. When shifting to 2$^{nd}$ gear, the first controllable one-way clutch or coupling assembly 23 is turned off; however, the passive one-way clutch or coupling assembly 21 remains on and still reacts to forward torque. The 2$^{nd}$ gear shift is then commanded and controlled by activating the second and third controllable one-way clutches or coupling assemblies 31, 33.

Figure 5:
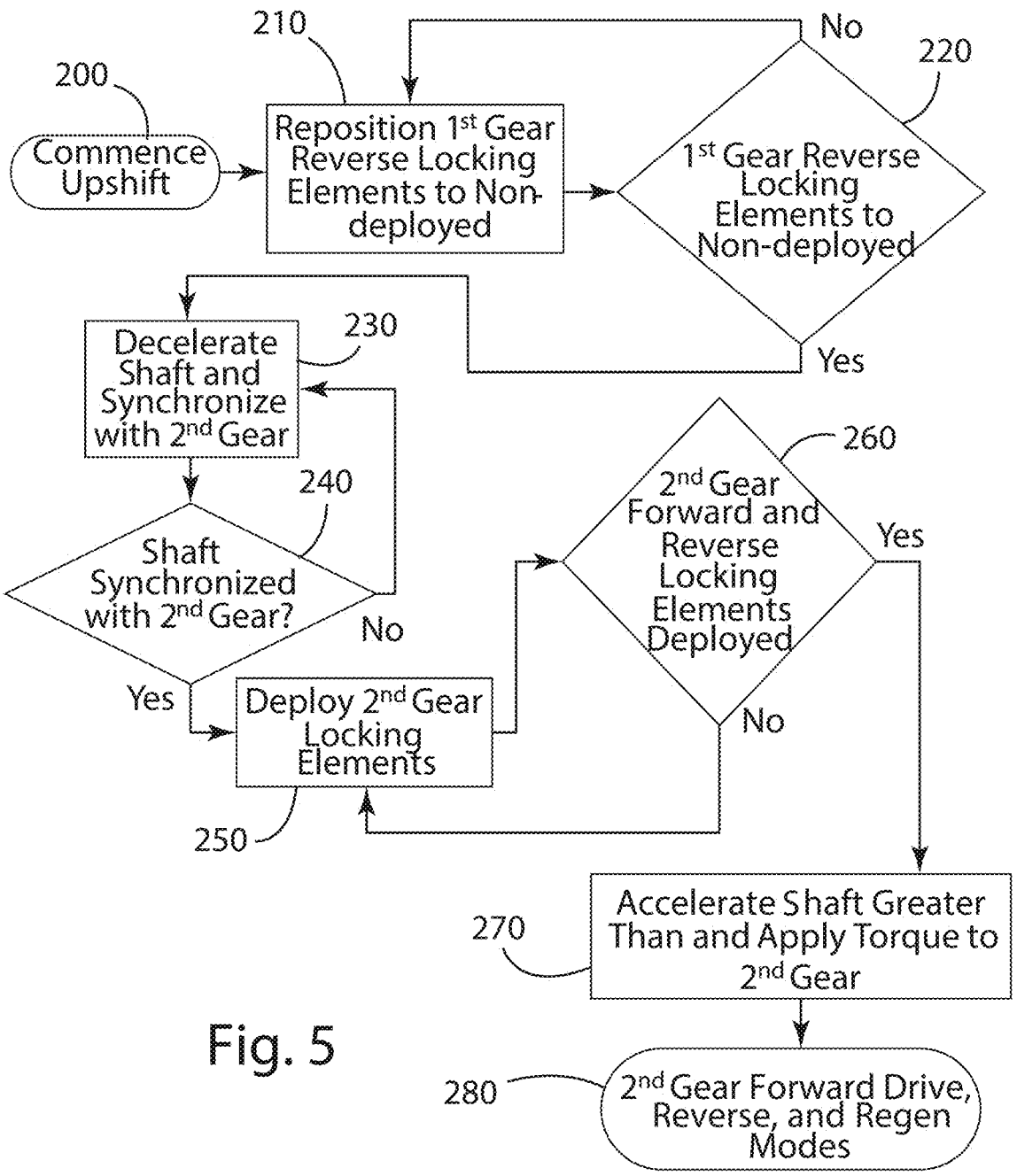
FIG. 5 is a flowchart of an example of a method of operation of a shift system for a power transmission assembly of FIGS. 2-4.
Figure 6:
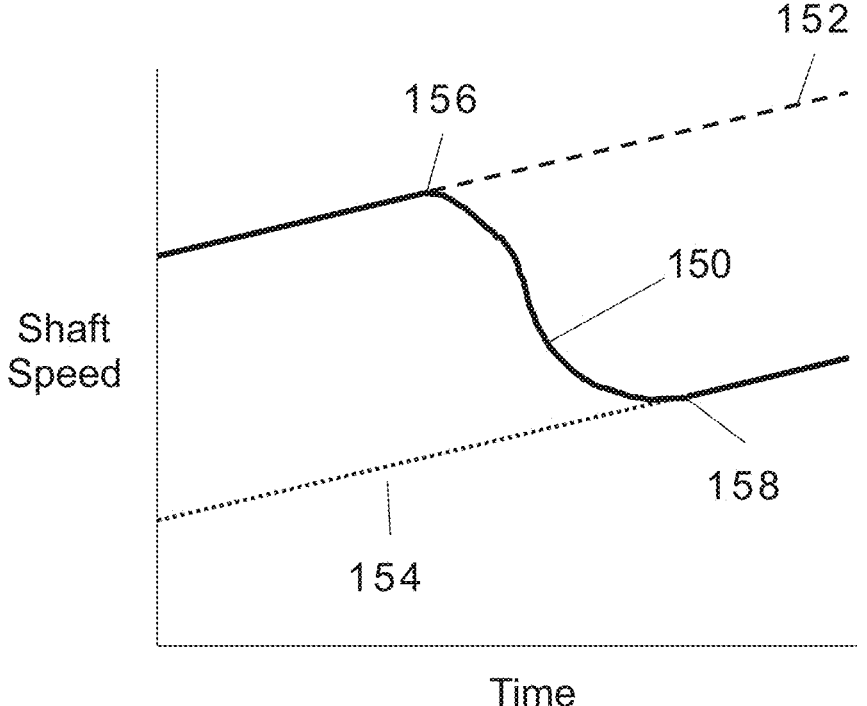
FIG. 6 speed over time diagram according to the method of FIG. 5.

FIG. 5 is a flowchart of one example of the inventive system and method showing an upshift from 1$^{st}$ gear to 2$^{nd}$ gear, wherein the power transmission system or assembly 10 shifts from 1$^{st}$ gear forward propulsive torque to 2$^{nd}$ gear forward propulsive torque. FIG. 6 is a speed over time diagram illustrating relative shaft and gear speeds. The drawing schematically illustrates the speed, solid line 150, of the first shaft 14; the speed, dashed line 152, of the gear 28; and the speed, dotted line 154, of the gear 36.

FIG. 5 shows the method begins in step 200 with a signal or command to commence an upshift from 1$^{st}$ gear forward to 2$^{nd}$ gear forward. Initially, the actuator 40 is in the first position-Position A. The passive one-way clutch or coupling assembly 21, including the forward torque transmitting locking element 30A, and the controllable one-way clutch or coupling assembly 23, including the reverse torque transmitting locking element 30B, are deployed. Each extends outward from its respective pocket 24A, 24B of the pocket plate 24. The locking elements 30A, 30B transfer forward, reverse, and regenerative torque, respectively. The locking elements 38A, 38B of the second and third controllable one-way clutches or coupling assemblies 31, 33 are nondeployed. Each locking element 38A, 38B remains in its respective pocket 32A, 32B. The locking elements 38A, 38B transfer no torque from the first shaft 14 through the gear 36 to the second gear assembly/ratio 20. Because the locking element 30A is deployed, it passively couples the shaft 14 and gear 28 in the forward direction. As shown in FIG. 6, the shaft 14 and gear rotate together at the same speeds 150, 152, the solid and dashed lines are coincident.

In Step 210, in preparation for the shift, the actuator moves to the second position—Position B, repositioning the locking elements 30B associated with reverse torque from the deployed position to a nondeployed position. As the shift assembly prepares for the power on upshift from the 1$^{st}$ gear assembly/ratio 18 to the 2$^{nd}$ gear assembly/ratio 20, the locking element 30B of the first controllable one-way clutch or coupling assembly 23 associated with the reverse torque is disengaged or nondeployed, placed in the pocket 24B of the pocket plate 24. In this position, the passive one-way clutch or coupling assembly 21 remains on and transfers torque in the forward direction, while the first controllable one-way clutch or coupling assembly 23 is turned off, wherein no torque is transferred in the reverse or regenerative direction. Referring to FIG. 6, the respective speeds 150, 152 of the shaft 14 and gear 28 are equal, and the solid and dashed lines remain coincident because the propulsive torque is in the forward direction through the locking element 30A.

In Step 220, if desired, the method determines if the locking elements 30B are nondeployed. If not, the method returns to step 220. If the locking elements 30B are disengaged or nondeployed, the method proceeds to step 230.

In step 230 the system decelerates the speed of the first shaft 14 and synchronizes the speed of the first shaft 14 with the speed of the gear 36 of the second gear assembly/ratio 20. FIG. 6 shows the speed 150 of the first shaft 14 decelerating and diverging at point 156 from the speed 152 of the gear 28 of the first gear assembly/ratio 18. The speed 150 of the shaft 14 converges on and synchronizes at point 158 with the speed 154 of the gear 36 of the second gear assembly/ratio 20.

FIG. 6 shows the speed 150 of the shaft 14 decelerating and approaching the speed of the gear 36. While the speed 150 of the first shaft 14 continues to decelerate, a vehicle propulsion mechanism connected to the second shaft 16, for example, the vehicle wheels, rotates the second shaft 16. As the vehicle connected to the second shaft 16 continues in a forward direction, the second shaft 16 acts through the 1$^{st}$ gear assembly/ratio 18, including gear 29, to continue to rotate the gear 28. The rotation rate of gear 28 gradually slows as vehicle drag, friction, and other elements act on the vehicle. In one example of the present system, the shaft 14 is coupled to and driven by an electric motor. With an electric motor, the motor speed can be reduced rapidly. For example, the motor speed, and correspondingly the speed 150 of the first shaft 14, may go from 2000 to 1500 RPM in less than a second.

When the first shaft 14 rotates slower than the gear 28, the gear 28 overruns the first shaft 14, putting the locking element 30A of the passive one-way clutch or coupling assembly 21 in an overrun condition or state. Reduction of the speed 150 of the first shaft 14 automatically disconnects the locking element 30A of the passive one-way clutch or coupling assembly 21. It no longer provides forward torque as the gear 28 rotates faster than the first shaft 14.

FIG. 6 shows the speed 150 of the first shaft 14 continues to decelerate until it converges on and synchronizes with the speed 154 of the gear 36 of the second gear assembly/ratio 20. As shown, the speed 150 of the first shaft 14 decreases until it converges at point 158, with the speed 154 of the gear 36 of the 2$^{nd}$ gear assembly/ratio 20. At point 158, the speed of the first shaft 14 and the speed of gear 36 of the 2$^{nd}$ gear assembly/ratio 20, driven by the second shaft 16, synchronize, wherein the first shaft 14 rotates at the same speed as the gear 36 of the 2$^{nd}$ gear assembly/ratio 20, driven by gear 37 connected to the second shaft 16. Synchronize means relative rotating components are rotating within a predetermined window of rotational speed. In one example, a predetermined window of rotational speed is a difference of ±100 RPM. While defined as points 156, 158, they are not discrete points but encompass a range.

In step 240 the method determines if the speed 150 of the first shaft 14 is synchronized with the speed of the gear 36 or the 2$^{nd}$ gear assembly/ratio 20. If not, the method returns to step 230. If the respective speeds are synchronized, the method proceeds to step 250.

In step 250 the system deploys the locking elements associated with the second gear assembly/ratio 20 once the respective speeds 150, 154 of the shaft 14 and gear 36 are synchronized at point 158. When the gear 36 of the second gear assembly/ratio 20 and the first shaft 14 are synchronized, both rotating at rotational speeds within the predetermined window, the actuator moves to the third position—Position C. The locking elements 38A, 38B of the second and third controllable one-way clutches or coupling assemblies 31, 33 are deployed and engage respective notches 34A, 34B in the notch plate, connected to or part of the gear 36 coupling the first shaft 14 and the gear 36.

In step 260 the method determines if the locking elements 38A, 38B associated with the second gear assembly/ratio 20 are deployed. If not, the method returns to step 250. If the locking elements are deployed, the method proceeds to step 270.

In step 270 the system accelerates the first shaft 14 and applies torque to the second gear assembly/ratio 20. In FIG. 6, the respective speeds 150, 154 of the first shaft 14 and the gear 36 are equal because the propulsive torque is in the forward direction through the locking element 38A, and the solid and dotted lines are coincident.

In step 280, once coupled, the controllable clutches of the second controllable one-way clutch or coupling assembly 31 transfer torque from the motor through the first shaft 14, the second gear assembly/ratio 20, and the second shaft 16 to the vehicle propulsion mechanism, for example, the vehicle wheel. The system operates in the second gear assembly/ratio 20 and operates in forward, reverse, and regeneration modes.

FIGS. 5 and 6 illustrate an upshift from $1^{st}$ gear to $2^{nd}$ gear for forward propulsion torque. The passive one-way clutch or coupling assembly 21 and the first controllable one-way clutch or coupling assembly 23 are both in an engaged or deployed position. In preparing to shift, while still in the $1^{st}$ gear node, the passive one-way clutch or coupling assembly 21 remains in an engaged position, and the first controllable one-way or coupling assembly 23 is placed in a disengaged or nondeployed position, the first controllable one-way clutch or coupling assembly 23 is off. Once the motor speed drops within the predetermined window, the second and third controllable one-way clutches or coupling assemblies 31, 33 are engaged or deployed to transfer torque. Synchronization occurs between the vehicle speed and the motor speed. Because the vehicle speed can be monitored, and the motor speed changes rapidly, it is possible to control the motor speed to fit the predetermined window prior to actuating one or both of the second and third controllable one-way clutches or coupling assemblies 31, 33. In the $2^{nd}$ gear node, the second and third controllable one-way clutches or coupling assemblies 31, 33 are in an engaged or deployed position with the passive one-way clutch coupling assembly 21 in a deployed position, and the first controllable one-way clutch or coupling assembly 23 in a disengaged or nondeployed position, the first controllable one-way clutch or coupling assembly 23 is off.

Figure 7:
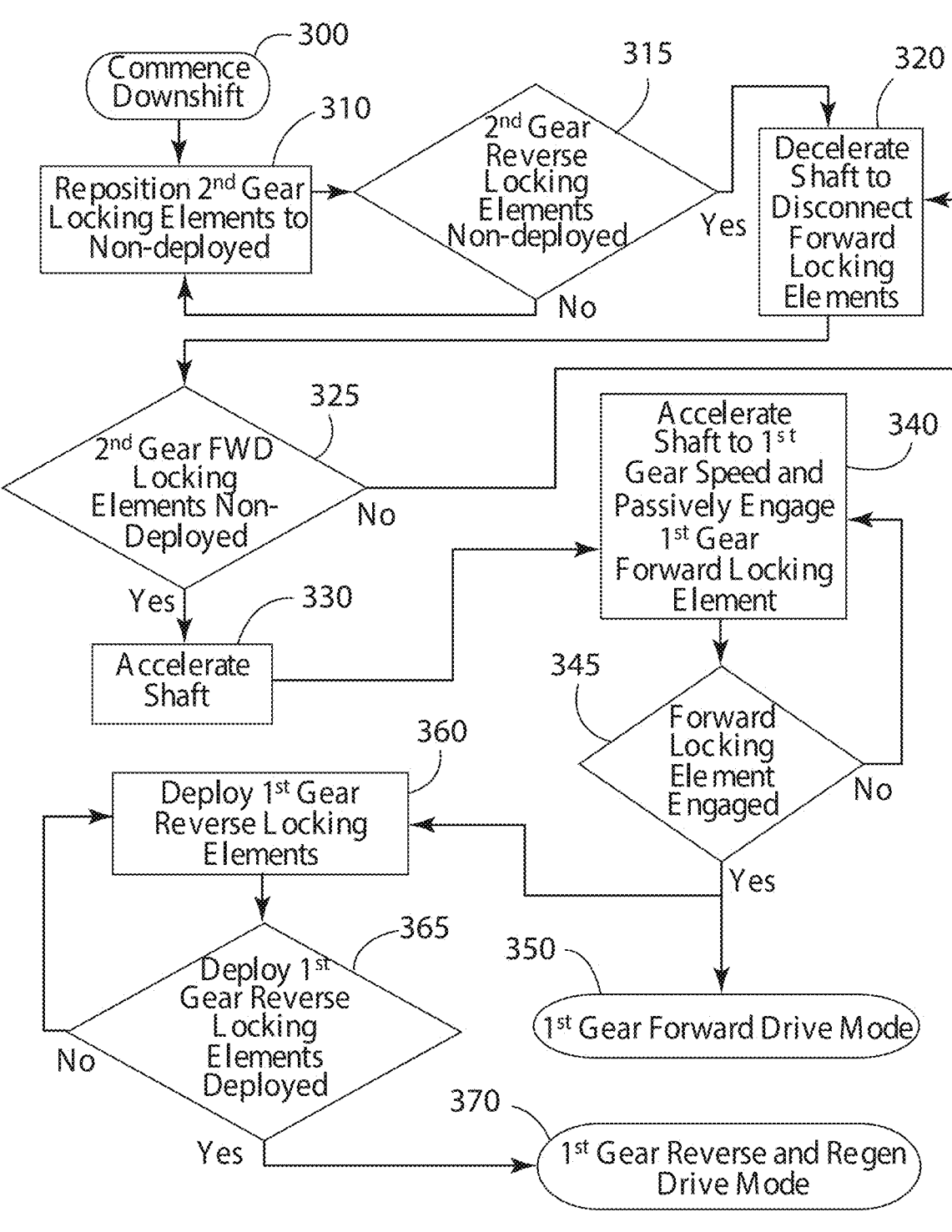
FIG. 7 is a flowchart of an example of another method of operation of a shift system for a power transmission assembly of FIGS. 2-4.
Figure 8:
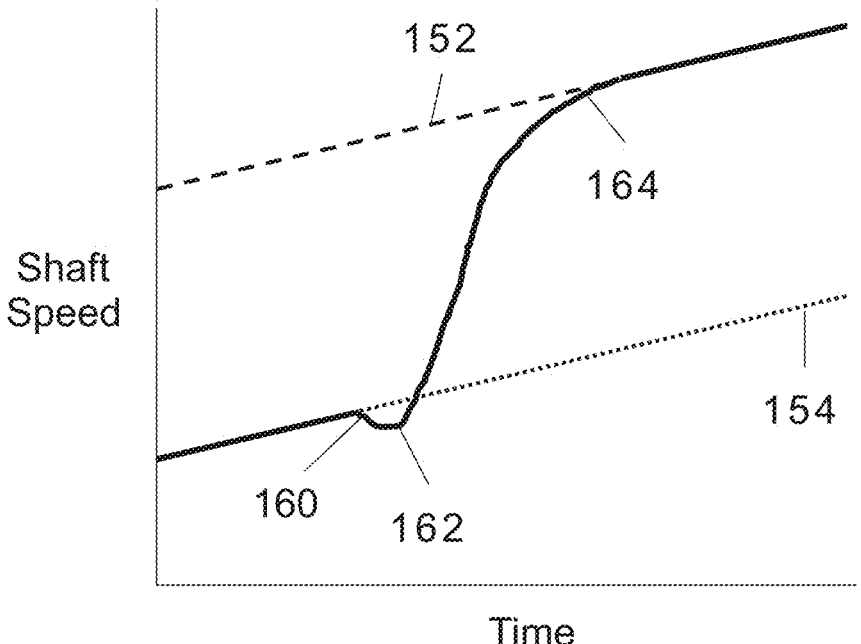
FIG. 8 speed over time diagram according to the method of FIG. 7.

FIG. 7 is a flowchart of one example of the inventive system and method showing a downshift from $2^{nd}$ gear to $1^{st}$ gear, wherein the power transmission system or assembly 10 shifts from $2^{nd}$ gear forward propulsive torque to $1^{st}$ gear forward propulsive torque. FIG. 8 is a motor speed over time diagram illustrating the speed, solid line 150, of the first shaft 14, the speed, dashed line 152, of the gear 28, and the speed, dotted line 154, of the gear 36.

FIG. 7 shows the method begins in step 300 with a signal or command to commence a downshift from $2^{nd}$ gear forward to $1^{st}$ gear forward. Initially, the actuator 40 is in the third position—Position C. The locking elements 38A, 38B of the second and third controllable one-way clutches or coupling assemblies 31, 33 are deployed. Each extends outward from its respective pocket 32A, 32B of the pocket plate 32. Because the locking element 38A is deployed, it couples the first shaft 14 and gear 36 in the forward direction, wherein they rotate together at the same speed 150, 154, and the solid and dotted lines are coincident because the propulsive torque is in the forward direction through the locking element 38A. The locking element 30B of the first controllable one-way clutch or coupling assembly 23 associated with $1^{st}$ gear reverse torque is disengaged or nondeployed.

In step 310, in preparation for the downshift, the actuator 40 moves to the second position—Position B and repositions the locking elements 38A, 38B of the second and third controllable one-way clutch or coupling assembly 31 in a nondeployed position. However, because the locking element 38A is still carrying forward torque, it may remain in a deployed position and still engaged.

In Step 315 the method determines if the locking elements 38B are nondeployed. If not, the method returns to step 310. If the locking elements 38B are nondeployed, the method proceeds to step 320.

In step 320 the system decelerates the speed 150 of the first shaft 14 to remove torque and reposition the forward locking elements to a nondeployed position. FIG. 8 shows the speed 150 of the first shaft 14 diverges, falls below the speed of the gear 36 starting at point 160. Decreasing the speed 150 of the first shaft 14 below that of the speed 154 of the gear 36 removes the forward torque on the locking element 38A, allowing disengagement wherein the force of the return biasing member or spring 61A acts on the locking element 38A moving it to the nondeployed position.

Step 325 determines if the locking elements 38A are nondeployed. If not, the method returns to step 320. If the locking elements 38A are nondeployed, the method proceeds to step 330.

Step 330 accelerates the speed 150 of the first shaft 14. As shown in FIG. 8, the speed 150 of the first shaft 14 accelerates from a low point 162 of the speed 150, passes the speed 154 of the gear 36, and continues toward the speed 152 of the gear 28.

Step 340 continues the acceleration and increases the speed 150 of the first shaft 14 until it reaches the speed of the gear 28 of the first gear assembly/ratio 18. FIG. 8 shows the speed 150 of the first shaft 14 converging on and synchronizing with the speed 152 of the gear 28 at point 164. Once the respective speeds 150, 152 synchronize, the locking element 30A of the passive one-way clutch or coupling assembly 21 engages, connects, and begins to transfer torque, wherein the speed 150, 152 of the first shaft 14 and the gear 28 is the same, the solid and dashed lines are coincident.

In step 345 the method determines if the locking elements 30A are engaged or deployed. If not, the method returns to step 340. If the locking elements 30A are engaged or deployed, the method proceeds to step 350 and step 360.

In step 350, the system operates in the first gear assembly/ratio 18 in the forward mode. The first shaft 14 rotates at the same forward speed as the gear 28 of the first gear assembly/ratio 18, and the lines 150 and 152 are coincident.

In Step 360 the actuator 40 moves to the first position-Position A. The system deploys the $1^{st}$ gear locking elements 30B. Referring to FIG. 8, when the gear 28 of the first gear assembly/ratio 18 and the first shaft 14 are both rotating at rotational speeds within the predetermined window after point 164, the system deploys the locking elements 30B of the first controllable one-way clutch or coupling assembly 23.

In step 365 the method determines if the locking element 30B is deployed. If not, the method returns to step 360. If the locking element 30B is deployed, the method proceeds to step 370.

In step 370 the system operates in 1$^{st}$ gear, the first gear assembly/ratio 18, in forward, reverse, and regeneration modes. In the regeneration mode the system provides regeneration torque-regenerative braking.

FIGS. 7 and 8 illustrate a downshift from 2$^{nd}$ gear to 1$^{st}$ gear in forward propulsive torque. The locking element 38A associated with forward torque remains in an engaged or deployed position, extending from the pocket 32B. The locking element 38B, associated with reverse and regenerative torque, is disengaged or nondeployed, is placed in, and remains in the pocket 32A of the pocket plate 32. The shift continues by accelerating the motor to the rotational speed of the 1$^{st}$ gear assembly/ratio 18 and corresponding gear 28. The first shaft 14 and motor overrun the locking element 38B as the rotational speed of the first shaft 14 exceeds that of the gear 36. The motor increases the rotational speed of the first shaft 14 until it catches up to the rotational speed of the 1$^{st}$ gear assembly/ratio 18 and corresponding gear 28, at which point the forward locking element 30A stops overrunning. Once the locking element 30A engages the gear 28, the shift assembly activates the locking element 30B, moving locking element 30B to an engaged or deployed position whereby the locking element 30B provides regenerative torque to the gear 28 and, correspondingly, the 1$^{st}$ gear assembly/ratio 18. The locking element 30B of the first controllable one-way clutch or coupling assembly 23 is engaged or deployed, extends outward from the pocket 24A of the pocket plate 24, and transmits regenerative torque from the second shaft 16 to the first shaft 14 and, correspondingly the motor.

Figure 9:
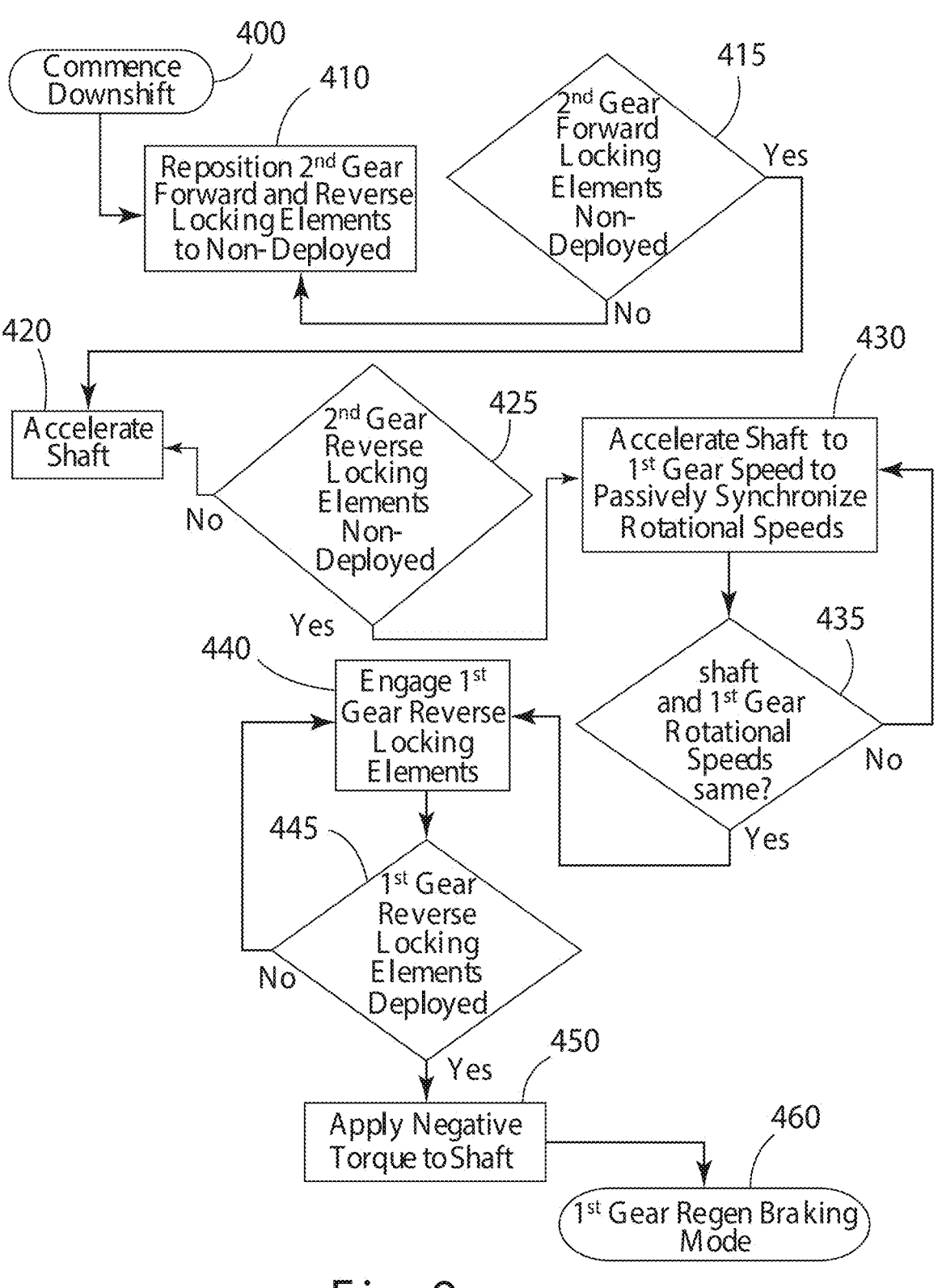
FIG. 9 is a flowchart of an additional example of a method of operation of a shift system for a power transmission assembly of FIGS. 2-4.
Figure 10:
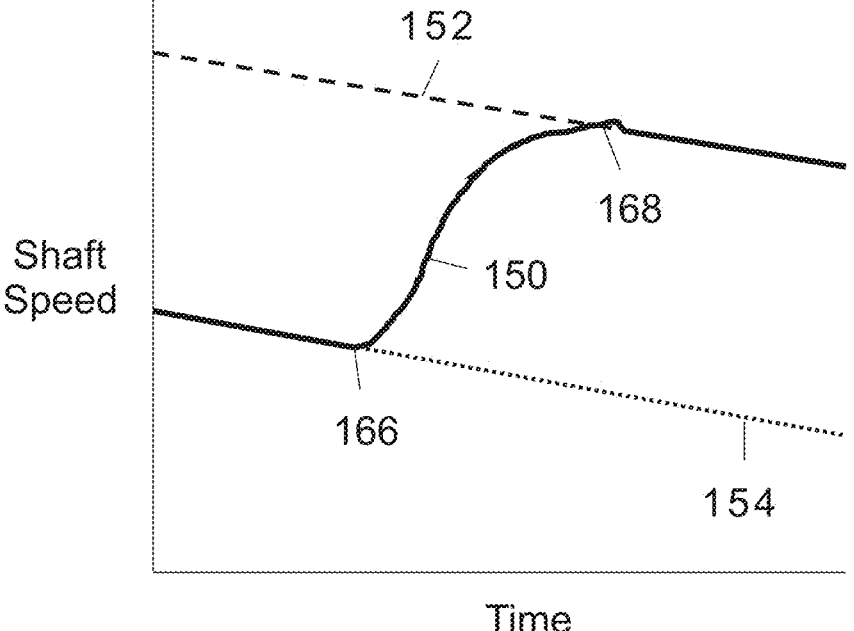
FIG. 10 speed over time diagram according to the method of FIG. 9.

Referring to the drawings, FIG. 9 is a flowchart of one example of the inventive system and method showing a downshift from 2$^{nd}$ gear to 1$^{st}$ gear, wherein the power transmission system or assembly 10 downshifts from 2$^{nd}$ regenerative torque—regenerative braking to 1$^{st}$ gear regenerative torque—regenerative braking. FIG. 10 is a speed over time diagram illustrating the speed, solid line 150, of the first shaft 14, the speed, dashed line 152, of the gear 28, and the speed, dotted line 154, of the gear 36.

FIG. 9 shows the method begins in step 400 with a signal or command to commence a downshift from 2$^{nd}$ regenerative torque—regenerative braking to 1$^{st}$ gear regenerative torque—regenerative braking. Initially, the actuator 40 is in the third position—Position C. The locking elements 38A, 38B of the second and third controllable one-way clutches or coupling assemblies 31, 33 are deployed and transfer forward and regenerative torque. As shown in FIG. 10, because the locking elements 38A, 38B are deployed, the speed 150 of the shaft 14 and the speed 154 of the gear 36 are the same, and the solid line and dotted lines are coincident.

In step 410, in preparation for the shift, the actuator moves to the second position—Position B. The locking elements 38A, 38B are repositioned from the initial deployed position to a nondeployed position. However, because the locking element 38B is still carrying reverse torque, it may remain in a deployed position and still engaged.

In step 415 the method determines if the locking elements 38A, 38B are nondeployed. If not, the method returns to step 410. If the locking elements 38A, 38B are nondeployed, the method proceeds to step 420.

In step 420 the system accelerates the speed 150 of the first shaft 14 to remove torque and reposition the reverse locking elements 38B to a nondeployed position. FIG. 10 shows the speed 150 of the first shaft 14 accelerates at point 166. Wherein the speed 150 of the first shaft 14 and the speed 154 of the gear 36 diverge, with the speed of the first shaft 14 increasing above the speed of the gear 36 starting at point 166. Increasing the speed 150 of the first shaft 14 above the speed 154 of the gear 36 removes any reverse torque on the locking element 38B, allowing disengagement. For example, the force of the return biasing member or spring 61B acts on the locking element 38B once the torque is removed to move it to the nondeployed position.

Step 425 determines if the locking elements 38B are nondeployed. If not, the method returns to step 420. If the locking elements 38B are nondeployed, the method proceeds to step 430.

Step 430 accelerates the speed 150 of the first shaft 14 to the speed 152 of gear 28, wherein the locking element 30A passively engages and couples the first shaft 14 and the gear 28. FIG. 10 shows the speed 150 of the first shaft converging on the speed 152 of the gear 28 at point 168. Once the speed 150 of the first shaft 14 reaches the speed 152 of the gear 28, the locking element 30A of the passive one-way clutch or coupling assembly 21 engages, couples the two, and enables torque transfer for forward propulsion. Increasing the speed 150 of the first shaft 14 correspondingly increases the speed of the gear 28, and the solid line and dashed lines are coincident.

In step 435 the method determines if the rotational speeds of the first shaft 14 and gear 28 are the same. If not, the method returns to step 430. If the speeds match, the method proceeds to step 440.

In step 440, the system deploys the locking elements 30B associated with 1$^{st}$ gear reverse once the respective speeds 150, 152 of the shaft 14 and gear 28 are the same, and the locking element 30A passively couples the first shaft 14 and gear 28. When the speeds 150, 152 of the first shaft 14 and the gear 28 are synchronized, the actuator 40 moves to the first position—Position A, wherein the locking elements 30B of the first controllable one-way clutch or coupling assembly 23 are deployed and engage respective notches 34B in the notch plate, connected to or part of the gear 28 coupling the first shaft 14 and the gear 28.

In step 445, the method determines if the locking elements 30B associated with the first gear assembly/ratio 18 are deployed. If not, the method returns to step 440. If the locking elements are deployed, the method proceeds to step 450.

In Step 450 the system applies a negative or reverse torque to the first shaft 14. The negative or reverse torque resulting from shaft 16 driving the first gear assembly/ratio 18 and, correspondingly, the first shaft 14. In step 460 the system operates in 1$^{st}$ gear regeneration mode.

FIGS. 9 and 10 illustrate a downshift from 2$^{nd}$ gear to 1$^{st}$ gear, wherein the power transmission system or assembly 10 downshifts from 2$^{nd}$ regenerative torque—regenerative braking to 1$^{st}$ gear regenerative torque—regenerative braking. Initially, the locking elements 38A, 38B of the second and third controllable one-way clutches or coupling assemblies 31, 33 are engaged and transfer forward and regenerative torque. As the shift assembly prepares to downshift from 2$^{nd}$ gear to 1$^{st}$ gear, the locking element 38A associated with forward torque is disengaged or nondeployed, is placed in, and remains in the pocket 32A of the pocket plate 32. The locking element 38B, associated with reverse and regenerative torque, remains in an engaged or deployed position, extending from the pocket 32B. The shift continues by accelerating the motor to the rotational speed of the 1$^{st}$ gear assembly/ratio 18 and corresponding gear 28. The first shaft 14 and motor overrun the locking element 38B as the rotational speed of the first shaft 14 exceeds that of the gear 36. The motor increases the rotational speed of the first shaft 14 until it catches up to the rotational speed of the 1$^{st}$ gear assembly/ratio 18 and corresponding gear 28, at which point the forward locking element 30A stops overrunning. After the locking element 30A engages the gear 28, the shift assembly activates locking element 30B and moves locking element 30B to an engaged or deployed position, whereby the locking element 30B provides regenerative torque to the gear 28 and correspondingly, the $1^{st}$ gear assembly/ratio 18. The locking element 30B of the first controllable one-way clutch or coupling assembly 23 is engaged or deployed, and the locking element 30B extends outward from the pocket 24A of the pocket plate 24, transmitting regenerative torque from the second shaft 16 to the first shaft 14 and correspondingly the motor.

Figure 11:
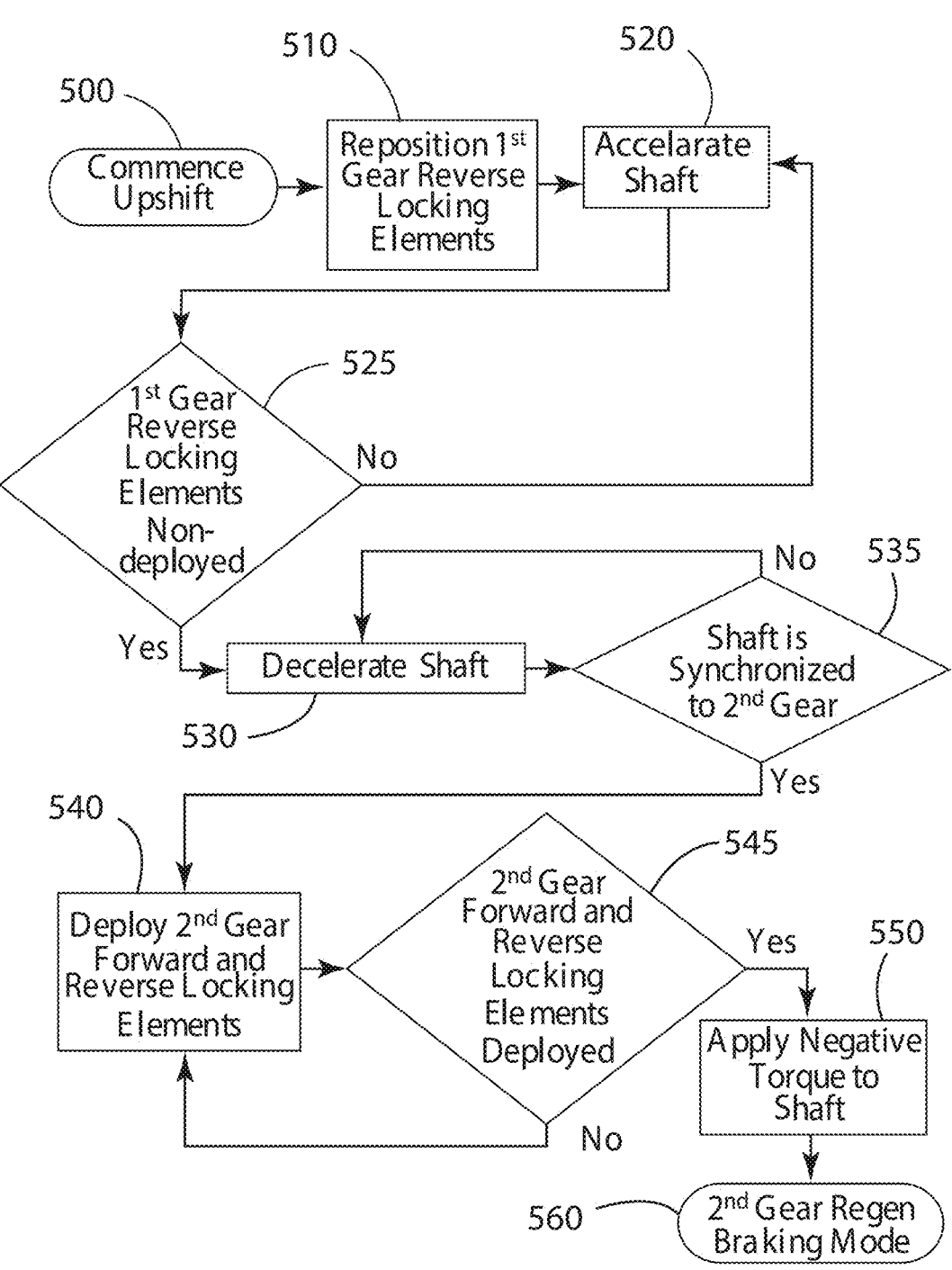
FIG. 11 is a flowchart of a further example of a method of operation of a shift system for a power transmission assembly of FIGS. 2-4.
Figure 12:
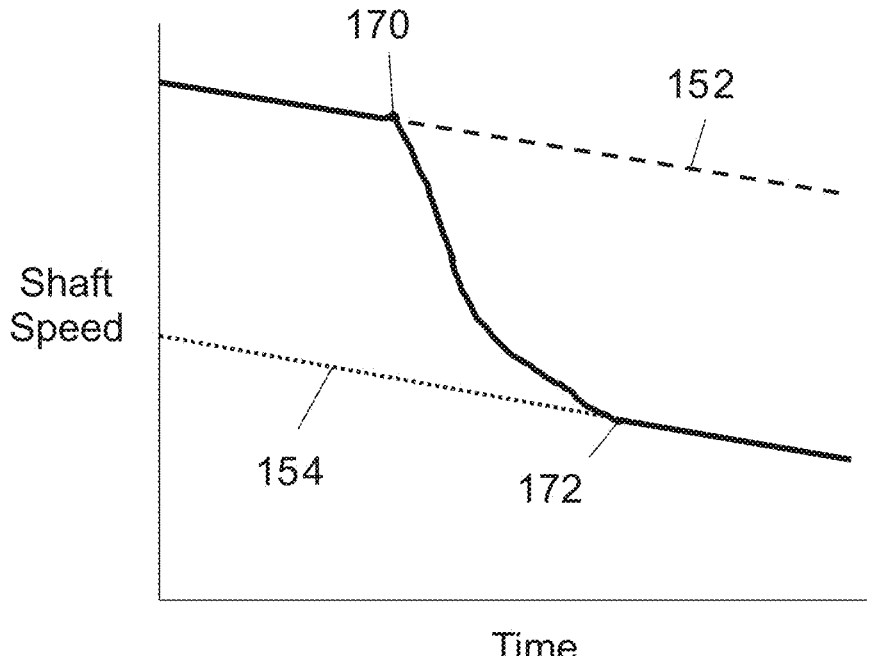
FIG. 12 speed over time diagram according to the method of FIG. 11.
Figures 13, 13A, 13B:
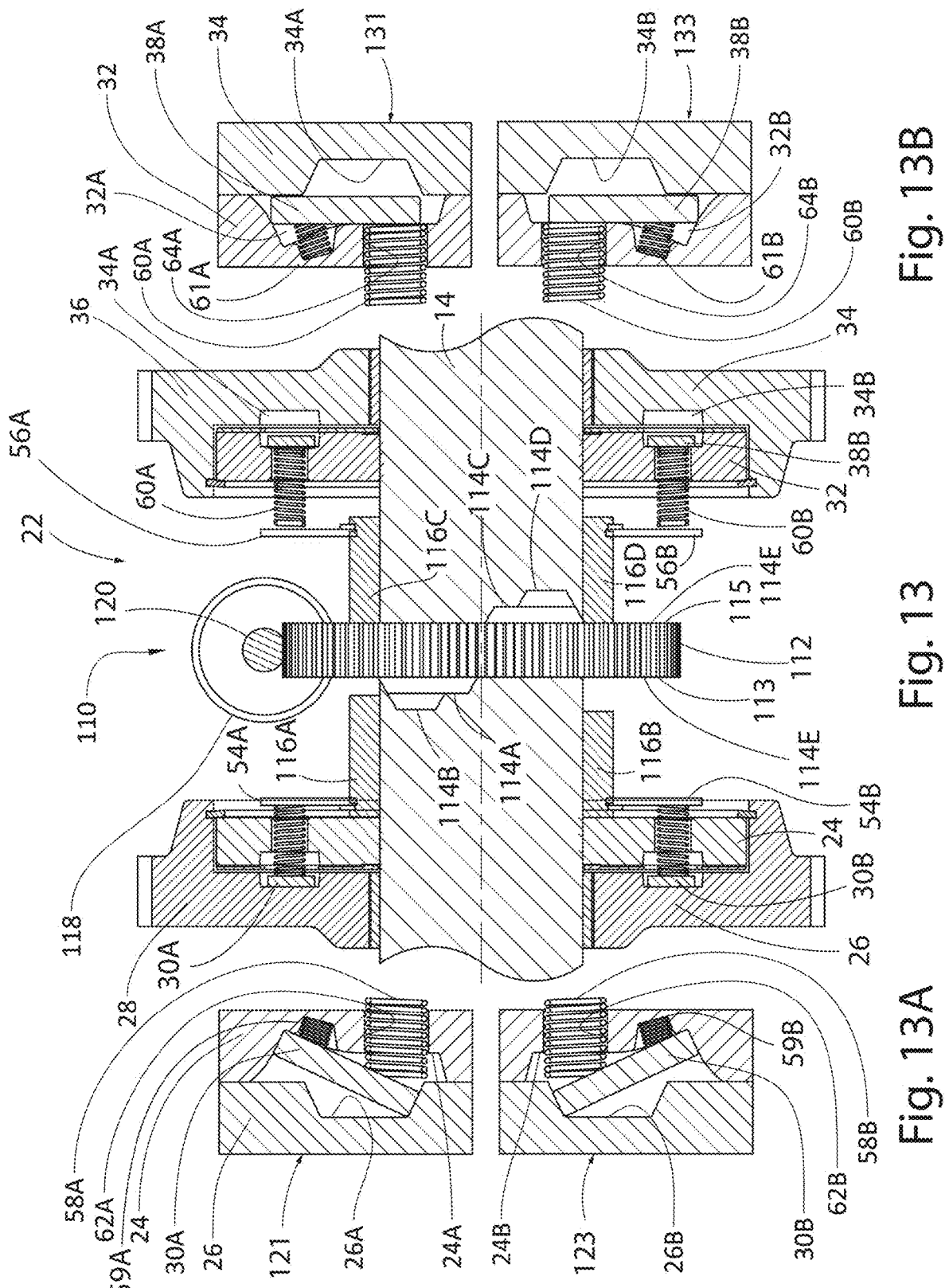
FIG. 13 is a schematic cross-sectional view illustrating another example of a shift system and mechanism for use with the power transmission system of FIG. 1, including an actuator in one position.
FIGS. 13A and 13B are exploded, cross-sectional views illustrating locking element positions for the actuator position of FIG. 13.
Figures 14, 14A, 14B:
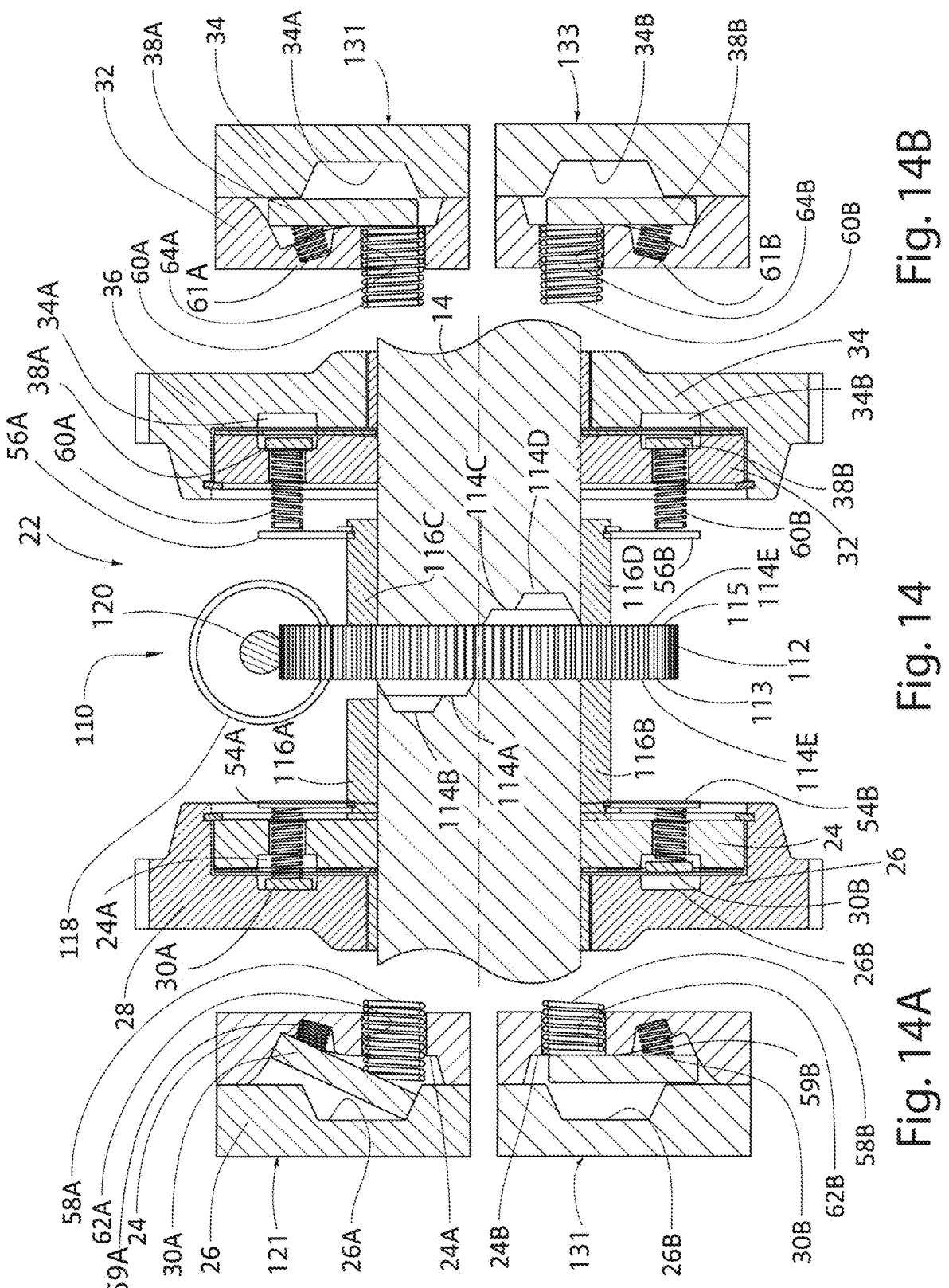
FIG. 14 is a schematic cross-sectional view illustrating another example of a shift system and mechanism for use with the power transmission system of FIG. 1, including the actuator in another position.
FIGS. 14A and 14B are exploded, cross-sectional views illustrating locking element positions for the actuator position of FIG. 14.
Figures 15, 15A, 15B:
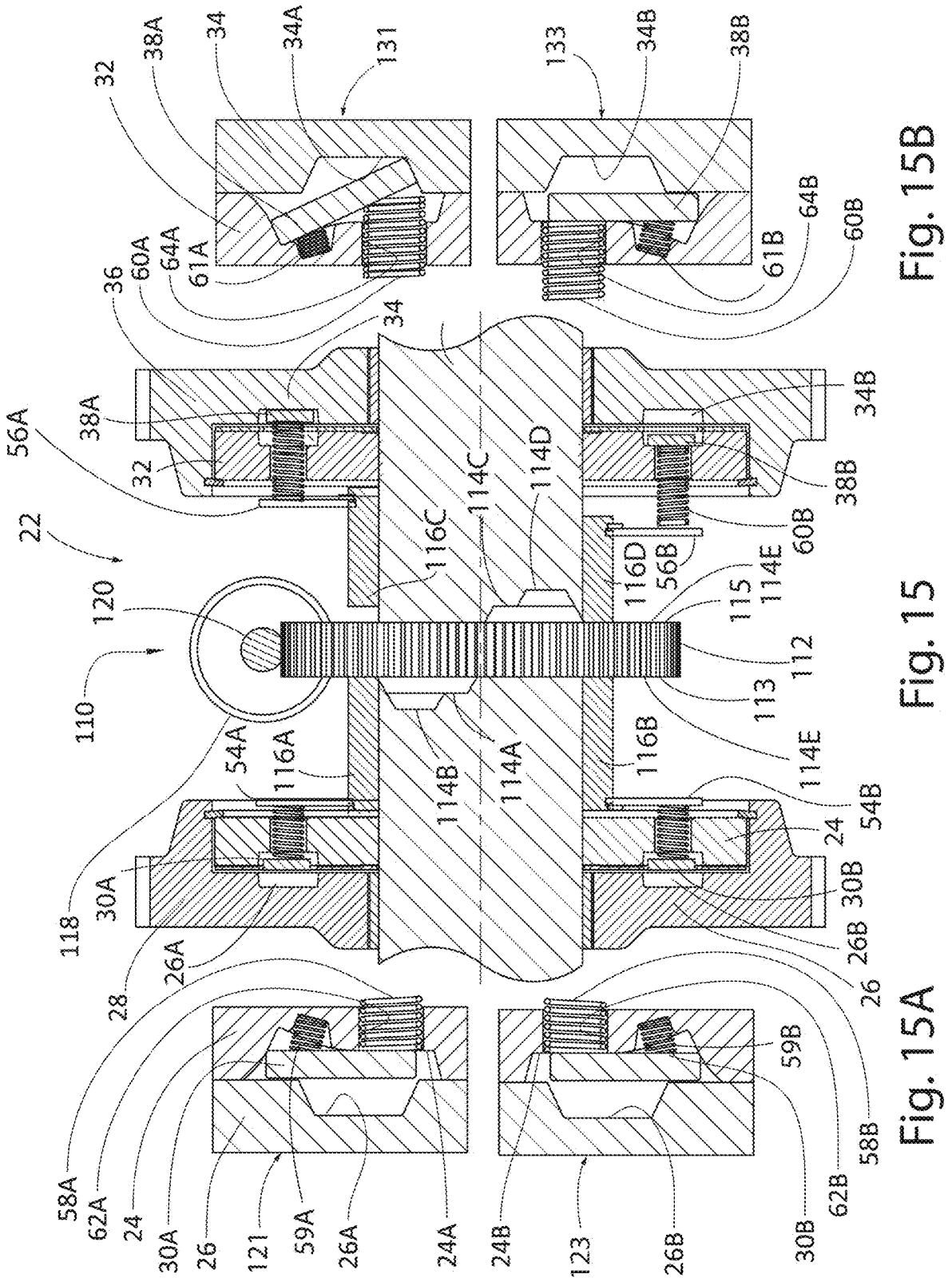
FIG. 15 is a schematic cross-sectional view illustrating another example of a shift system and mechanism for use with the power transmission system of FIG. 1, including an actuator in still another position.
FIGS. 15A and 15B are exploded, cross-sectional views illustrating locking element positions for the actuator position of FIG. 15.
Figures 16, 16A, 16B:
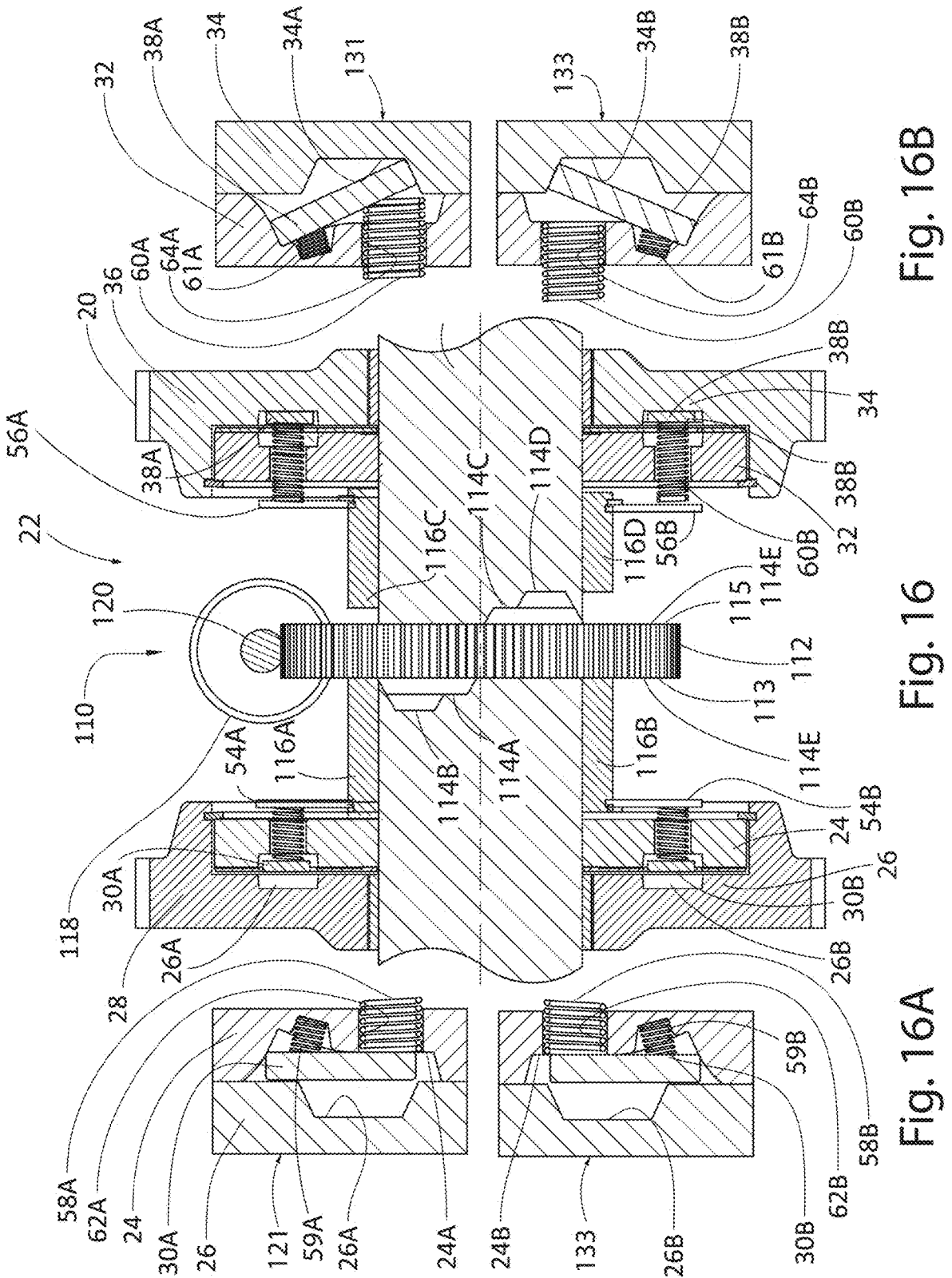
FIG. 16 is a schematic cross-sectional view illustrating another example of a shift system and mechanism for use with the power transmission system of FIG. 1, including an actuator in yet another position.
FIGS. 16A and 16B are exploded, cross-sectional views illustrating locking element positions for the actuator position of FIG. 16.
Figures 17, 17A, 17B:
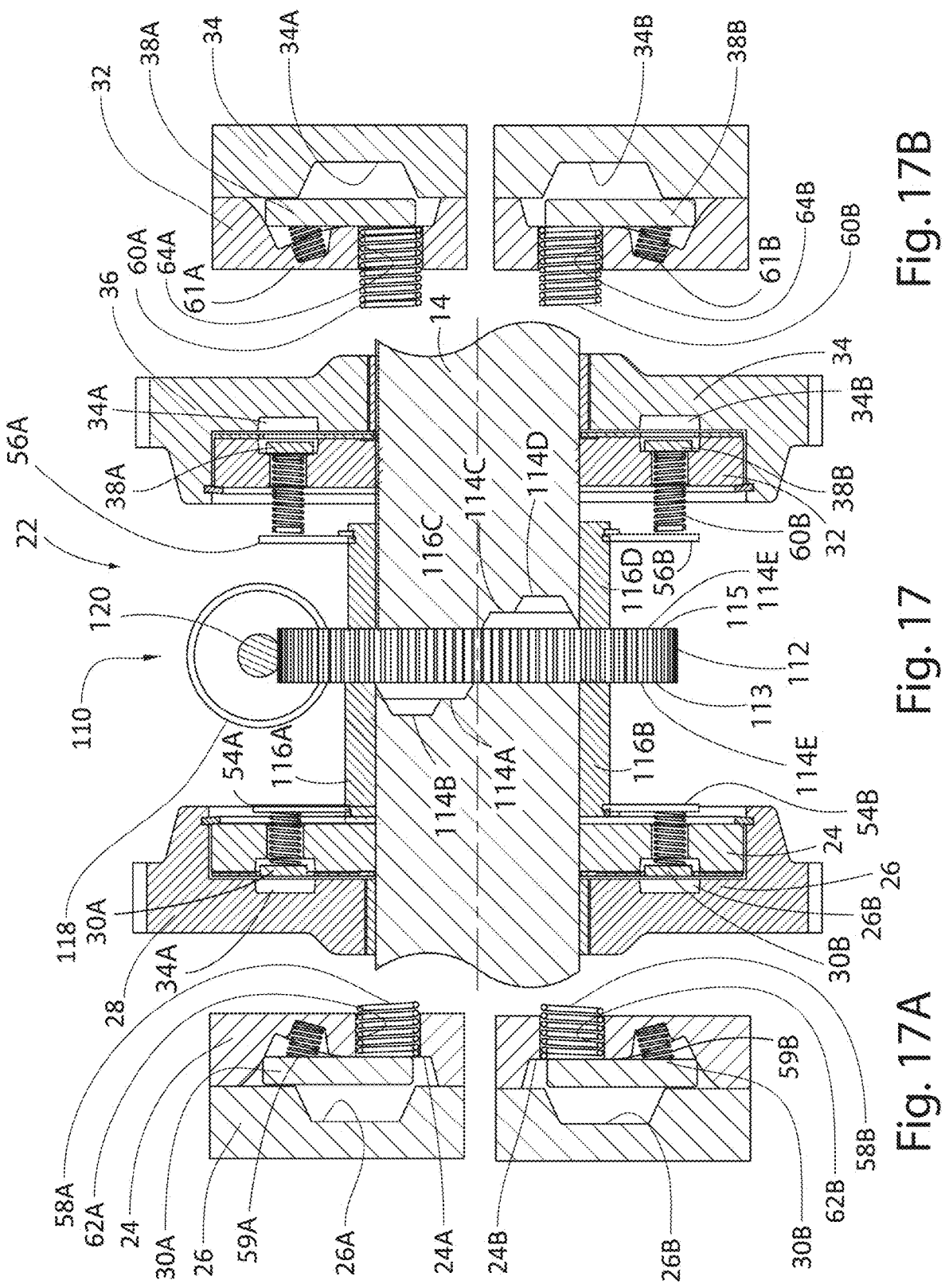
FIG. 17 is a schematic cross-sectional view illustrating another example of a shift system and mechanism for use with the power transmission system of FIG. 1, including an actuator in an additional position.
FIGS. 17A and 17B are exploded, cross-sectional views illustrating locking element positions for the actuator position of FIG. 17.

FIG. 11 is a flowchart of one example of the inventive system and method illustrating an upshift from $1^{st}$ gear to $2^{nd}$ gear, wherein the power transmission system or assembly 10 upshifts from $1^{st}$ gear regenerative torque—regenerative braking to $2^{nd}$ gear regenerative torque—regenerative braking. FIG. 12 is a speed over time diagram illustrating the speed, solid line 150, of the first shaft 14 speed, dashed line 152, of the gear 28, and the speed, dotted line 154, of the gear 36.

FIG. 11 shows the method begins in step 500 with a signal or command to commence an upshift from $1^{st}$ gear regenerative torque—regenerative braking to $2^{nd}$ gear regenerative torque—regenerative braking. Initially, the actuator 40 is in the first position—Position A. The forward locking elements 30A of the passive one-way clutch or coupling assembly 21 and the reverse torque transmitting locking element 30B of the controllable one-way clutch or coupling assembly 23 are deployed and transfer both forward and reverse regenerative torque. Because the locking elements 30A, 30B are deployed, the speed 150 of the shaft 14 and the speed 152 of the gear 28 are the same, and the solid line and the dashed line are coincident.

In step 510, in preparation for the upshift from $1^{st}$ to $2^{nd}$ gear, the actuator moves to the second position—Position B. The locking elements 30B are repositioned from the initial deployed position to a nondeployed position. However, because the locking element 30B is still carrying torque it may remain in a deployed position and still engaged.

In step 520 the system accelerates the speed 150 of the first shaft 14 to a point 170 above the speed 152 of the gear 28, wherein the speed 150 of the first shaft 14 and the speed 152 of the gear 28 diverge, with the speed of the shaft 14 increasing above the speed of the gear 28 for a brief period. The speed 150 of the shaft 14 blips above the speed 152 of the gear 28 to remove torque on the locking element 30B, allowing disengagement. The force of the return biasing member or spring 59B acts on the locking element 30B once the torque is removed to move it to a nondeployed position.

Step 525 determines if the locking elements 30B are nondeployed. If not, the method returns to step 520. If the locking elements 30B are nondeployed, the method proceeds to step 530.

Step 530 decelerates the speed 150 of the first shaft to synchronize with the speed 154 of the gear 36. FIG. 12 shows the speed 150 of the first shaft 14 decelerating, converging on, and synchronizing with the speed 154 of the gear 36 at point 172.

In step 535 the method determines if the speeds of the first shaft 14 and gear 36 are synchronized. For example, as shown in FIG. 12, the speeds 150, 154 are coincident. If not, the method returns to step 530. If the speeds are synchronized, the method proceeds to step 540.

In step 540, the actuator moves to the third position—Position C. The system deploys the locking elements 38A, 38B. When the gear 36 of the second gear assembly/ratio 20 and the first shaft 14 are both rotating at rotational speeds within the predetermined window, in one example at the same speed, the locking elements 38 A, 38 B of the second and third controllable one-way clutches or coupling assemblies 31, 33 are deployed and engage respective notches 34A, 34B in the notch plate 34, connected to or part of the gear 36, coupling the first shaft with the gear 36.

Step 545 determines if the locking elements 38A, 38B associated with the second gear assembly/ratio 20 are deployed. If not, the method returns to step 540. If the locking elements are deployed, the method proceeds to step 550.

In Step 550 the system applies negative or reverse torque to the shaft 14. The negative or reverse torque resulting from shaft 16 driving the second gear assembly/ratio 20 and, correspondingly the first shaft 14. In Step 560 the system operates in $2^{nd}$ gear regeneration mode.

FIGS. 11 and 12 illustrate an upshift from $1^{st}$ gear to $2^{nd}$ gear, wherein the power transmission system or assembly 10 upshifts from $1^{st}$ gear regenerative torque—regenerative braking to $2^{nd}$ gear regenerative torque—regenerative braking. As shown, both locking element 30A of the passive one-way clutch or coupling assembly 21 and the locking element 30B of the first controlled one-way clutch or coupling assembly 23 are engaged or deployed, extending outward from respective pockets 24A, 24B of the pocket plate 24, wherein the locking elements 30A, 30B engage and transfer forward torque and regenerative torque. As the shift assembly prepares to upshift from the $1^{st}$ gear to the $2^{nd}$ gear, the locking element 30A engages and applies a slight amount or blip of forward torque, which enables the locking element 30B associated with the reverse or regenerative torque to disengage or nondeploy, move to and remain in the pocket 24B of the pocket plate 24. The locking element 30A associated with the forward torque remains engaged or deployed and extends out of the pocket 24A. The shift continues by decelerating the motor and, correspondingly, the first shaft 14 to the rotational speed of the $2^{nd}$ gear assembly/ratio 20 and corresponding gear 36. The second shaft 16 and corresponding $1^{st}$ gear assembly/ratio 18, including the gear 28, overruns the locking element 30A as the rotational speed of the gear 28 exceeds that of the first shaft 14 and motor. The motor decreases the rotational speed of the first shaft 14 until it catches up to the rotational speed of the $2^{nd}$ gear assembly/ratio 20 and corresponding gear 36, as the motor speed decreases the gear 28, and correspondingly the $1^{st}$ gear assembly/ratio 18, overruns the forward locking element 30A. At this point, the second and third controllable one-way clutches or coupling assemblies 31, 33 are engaged or deployed to transfer forward, regenerative, and reverse torque using the $2^{nd}$ gear assembly/ratio 20. The $1^{st}$ gear assembly/ratio 18 transfers no torque even though the locking element 30A of the passive one-way clutch or coupling assembly 21 remains engaged/deployed. The gear 28 continuously overruns the locking element 30A as long as the first shaft 14 is coupled to the $2^{nd}$ gear assembly/ratio 20.

FIGS. 13-17 illustrate another example of the power transmission system or assembly 10 having a shift system 12 using a five-position cam actuator, generally seen at 110.

The five-position cam actuator 110 is operative to move the respective active locking elements 30A, 30B, 38A, 38B between an engaged/deployed position and a disengaged/ nondeployed position. The cam actuator 110 includes a cam sector or cam wheel 112 rotatably mounted about the shaft 14. A drive motor 118 and a drive gear 120 operate to move or rotate the cam wheel 112. The cam wheel 112 includes a cam profile including a plurality of cam lobes or projections 114 on opposing side surfaces 113, 115. The cam lobes or projections 114 have cam surfaces 114A, 114B, 114C, 114D that act on respective translators 116A, 116B, 116C, 116D causing the translators to slide, move back and forth, axially on the first shaft 14. The side surfaces 113, 115 of the cam wheel 112 form flat or neutral cam surfaces 114E. The axial movement of translators 116A, 116B, 116C, 116D moves the spring plates 54A, 54B, 56A, 56B and corresponding locking elements. Movement of the cam wheel 112 correspondingly moves or positions the cam surfaces 114A, 114B, 114C, 114D, 114E to position the translator portions 116A, 116B, 116C, 116D. The cam surfaces 114A, 114B, 114E on the first or left side 113 of the cam wheel 112 control the operation of the first and second active or controllable clutches or assemblies 121, 123 and correspondingly, the position of the locking elements 30A, 30B between an engaged/deployed position and a disengaged/nondeployed position. The cam surfaces 114C, 114D, 114E on the second or right side 115 of the cam wheel 112 control the operation of the third and fourth active or controllable clutches or assemblies 131, 133 and correspondingly the position of the locking elements 38A, 38B between an engaged/deployed position and a disengaged/nondeployed position. FIGS. 13-17 show exemplary cam surfaces 114A, 114B, 114C, 114D, it should be understood that as the cam wheel 112 rotates the cam surfaces 114A, 114B, 114C, 114D engage and move the translator portions 116A, 116B, 116C, 116D. While shown as four individual translator portions 116A, 116B, 116C, 116D, two translator portions could also be used, one on each side of the cam wheel 112 with the actuation members or springs 58A, 58B, 60A, 60B varying in length.

The position of the cam wheel 112 controls, through respective active or controllable clutch assemblies 121, 123, 132, 133, the positions, deployed or nondeployed, of the respective locking elements 30A, 30B, 38A, 38B. The positions of the locking elements associated with the cam actuator 110 are as follows: Position A—locking elements 30A, cam surface 114A, and locking elements 30B, cam surface 114B are deployed and both locking elements 38A, 38B are nondeployed, cam surface 114E; Position B—locking element 30A is deployed, cam surface 114A, and locking element 30B is nondeployed, cam surface 114E and locking elements 38A, 38B are nondeployed, cam surface 114E; Position C—locking elements 38A are deployed, cam surface 114C, and locking elements 38B are nondeployed, cam surface 114E, and locking elements 30A, 30B, are nondeployed, cam surface 114E; Position D—locking elements 38A are deployed, cam surface 114C and locking elements 38B are deployed, cam surface 14D, and locking elements 30A, 30B are nondeployed, cam surface 114E; and Position E—locking elements 30A, 30B, 38A, 38B are all nondeployed, cam surfaces 114E.

The power transmission system or assembly 10 provides the following system modes based on the position of the actuator 110. Position A provides $1^{st}$ gear forward, reverse, and regenerative torque. Position B provides $1^{st}$ gear forward torque and overruns when the gear 28 rotates faster than the first shaft 14. Position C provides $2^{nd}$ gear forward torque and overruns when the gear 36 rotates faster than the first shaft. Position D provides $2^{nd}$ gear forward, reverse, and regenerative torque. Position E provides a neutral position. As shown in FIGS. 13-17, the neutral position, Position E, is shown between Positions A and D, above Position A and below Position D. While shown adjacent, Positions B and C, cam surfaces 114A, 114C, may be circumferentially spaced on the cam wheel 112 providing an additional neutral position between them. Providing an additional neutral position, Position E between Positions B and C enables access to the neutral position, position E, from any of the four positions, Positions A, B, C, and D. While shown as a five-position cam actuator, other cam actuators could also be used. For example, a three-position cam actuator and a four-position cam actuator are also contemplated.

Figure 18:
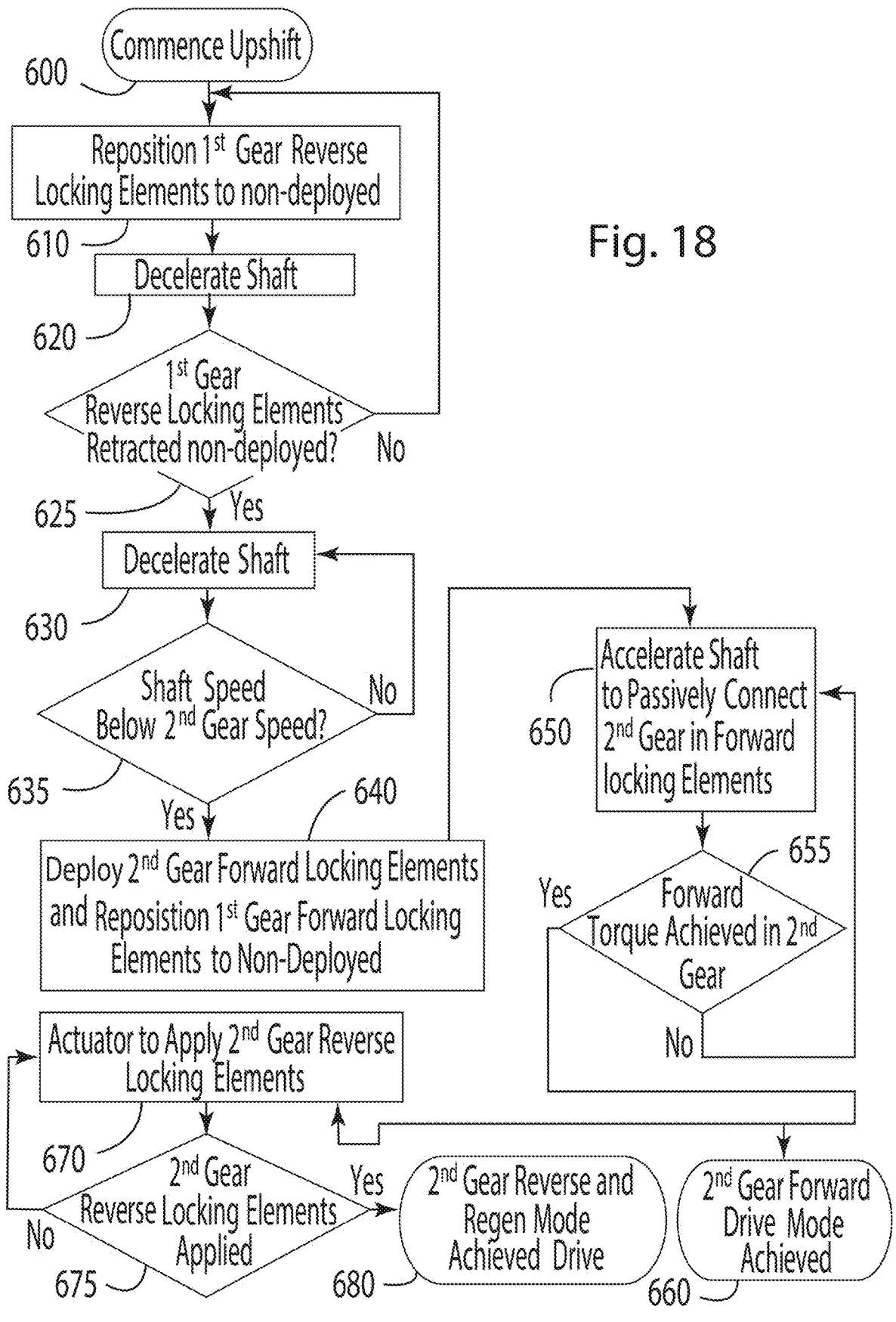
FIG. 18 is a flowchart of an example of a method of operation of a shift system for a power transmission assembly of FIGS. 13-17.
Figure 19:
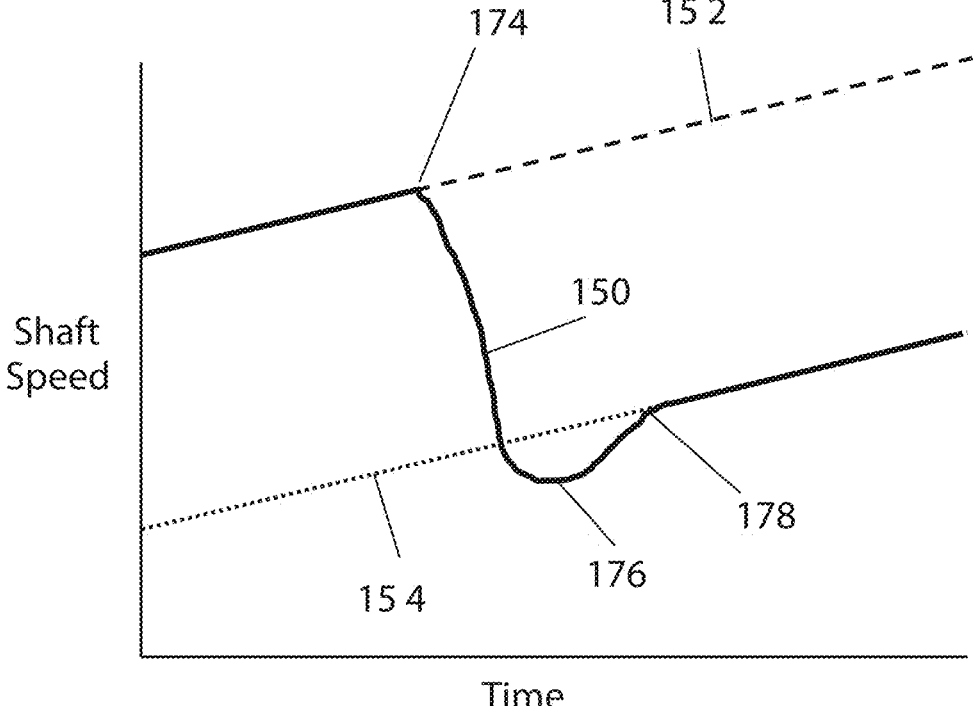
FIG. 19 speed over time diagram according to the method of FIG. 18.

FIG. 18 is a flowchart of the inventive system and method showing an upshift from $1^{st}$ gear to $2^{nd}$ gear using the five-position, five-mode cam actuation mechanism 110. As illustrated, the power transmission system or assembly 10 upshifts from $1^{st}$ gear forward propulsive torque to $2^{nd}$ gear forward propulsive torque. FIG. 19 is a speed over time diagram illustrating relative shaft and gear speeds. The drawing schematically illustrates the speed, solid line 150, of the first shaft 14; the speed, dashed line 152, of the gear 28; and the speed, dotted line 154, of the gear 36.

FIG. 18 shows the method begins in step 600 with a signal or command to commence an upshift from $1^{st}$ gear forward to $2^{nd}$ gear forward. Initially, the actuator 110 is in the first position—Position A. The locking elements 30A, 30B of the one-way clutches or coupling assemblies 121, 123 are controllable elements and are deployed. Each extends outward from its respective pocket 24A, 24B of the pocket plate 24 and engages respective notches 26A, 26B in the notch plate 26, which is connected to or part of the gear 28. The locking elements 30A, 30B transfer forward, reverse, and regenerative torque, respectively. The locking elements 38A, 38B of the one-way clutches or coupling assemblies 131, 133 are controllable elements and are nondeployed. Each locking element 38A, 38B remains in its respective pocket 32A, 32B. The locking elements 38A, 38B transfer no torque from the first shaft 14 through the gear 36 to the second gear assembly/ratio 20. As shown in FIG. 19, because the locking elements 30A, 30B are deployed, they couple the shaft 14 and gear 28 in the forward and reverse directions, wherein the shaft 14 and gear 28 rotate together, and the speeds 150, 152 are coincident.

In Step 610, in preparation for the upshift, the actuator 110 rotates to the second position—Position B. The locking elements 30B, associated with reverse torque, are repositioned from the deployed position to a nondeployed position. As the shift assembly prepares for the power on upshift from the $1^{st}$ gear assembly/ratio 18 to the $2^{nd}$ gear assembly/ratio 20, the locking element 30B of the second controllable one-way clutch or coupling assembly 123 associated with the reverse torque is disengaged or nondeployed, placed in the pocket 24B of the pocket plate 24. In Position B, the locking element 30A of the first controllable one-way clutch or coupling assembly 121 remains deployed and transfers torque in the forward direction. The second controllable one-way clutch or coupling assembly 123 is turned off, and no torque is transferred in the reverse or regenerative direction. FIG. 19 shows the speeds 150, 152 of the shaft 14 and gear 28 remain the same, and the lines 150 and 152 remain coincident because the propulsive torque is in the forward direction from the shaft 14 to the gear 28 through the locking element 30A.

Step 620 decelerates the speed 150 of the first shaft 14 below that of the speed 154 of the gear 36 of the second gear assembly/ratio 20. FIG. 19 shows the speed 150 of the first shaft 14 decelerating and diverging at point 174 from the speed 152 of the gear 28 of the first gear assembly/ratio 18.

In Step 625, if desired, the method determines if the locking elements 30B are nondeployed. If not, the method returns to step 610. If the locking elements 30B are disengaged or nondeployed, the method proceeds to step 620. Whether the locking elements 30B are engaged or deployed may be determined by applying a negative torque to the first shaft 14, wherein speed and torque sensors monitor the respective parameters of the components. In one example, speed sensors monitor the speed 150 of the shaft 14 and the speed 152 of the gear 28. If the respective speeds 150, 152 remain the same as the speed 150 of the shaft 14 decreases, then locking elements 30B may still be engaged.

Step 630 continues decelerating the speed 150 of the first shaft 14 below that of the speed 154 of the gear 36 of the second gear assembly/ratio 20. The speed 150 of the first shaft 14 continues to decelerate until it falls under the speed 154 of the gear 36, and in the example shown in FIG. 19 reaches point 176. Under means less than the speed of the gear 36. In one example, under means an amount greater than 50 RPM. For example, the speed 154 of the first shaft is at least 50 RPM less than the speed 150 of the gear 36.

In step 635, if desired, the method determines if the speed 150 of the first shaft 14 is below the speed 154 of the gear 36 of the second gear assembly/ratio 20. If not, the method returns to step 620. If the speed is below, the method proceeds to step 630. Again, speed sensors monitor the speed 150 of the shaft 14 and the speed 154 of the gear 36.

In step 640 the actuator 110 moves to the third position-Position C, wherein the system deploys the locking elements 38A of the controllable one-way clutch or coupling assembly 131 used for forward propulsion torque in the $2^{nd}$ gear node and repositions the locking elements 30A of the controllable one-way clutch or coupling assembly 121 used for forward propulsion torque in the $1^{st}$ gear to nondeployed. As shown in FIG. 19, the speed 150 of the shaft 14 is below the speed 152, 154 of the gears 28, 36. Because the speed 150 is below the speed 152 of the gear 28, the gear 28 is rotating faster than the shaft 14, so there is no forward torque on locking element 30A; it is in an overrun state and can be repositioned to nondeployed. Likewise, because the speed 150 of the shaft 14 is below the speed 154 of the gear 36, the gear 36 rotates faster than the shaft 14, so there is no forward torque on locking element 38A; it can be deployed and is in an overrun state.

Step 650 accelerates the speed 150 of the first shaft 14 to the speed 154 of the gear 36 of the second gear assembly/ratio 20. FIG. 19 shows the speed 150 of the first shaft 14 increasing, reaching, and ultimately becoming equal to the speed 154 of the gear 36 of the second gear assembly/ratio 20 at point 178. Because the locking elements 38A are deployed, once the speed 150 of the first shaft 14 reaches or equals the speed 154 of the gear 36 at point 178, the locking elements 38A automatically couples the shaft 14 to the second gear assembly/ratio 20 by engaging respective notches 34A in the notch plate 34, which is connected to or part of the gear 36. The locking element 38A functions passively because it passively connects and begins to transfer torque between the first shaft 14 and the gear 36, wherein the gear 36 rotates at the same speed as the first shaft 14. As shown in FIG. 19, the speeds 150, 154 of the shaft 14 and gear 36 are coincident. While shown as discreet points, 174, 176, 178, they are not necessarily discrete points but may encompass a range.

In step 655, if desired, the method determines if the locking elements 38A are engaged or deployed. If not, the method returns to step 650. If the locking elements 38A are engaged or deployed, the method proceeds to step 660 and step 670. Whether the locking elements 38A are engaged or deployed may be determined by applying a positive or forward torque to the first shaft 14, wherein speed and torque sensors monitor the respective parameters of the components.

In step 660, the system operates in the second gear assembly/ratio 20 in the forward mode. The first shaft 14 rotates at the same forward speed as the gear 36 of the second gear assembly/ratio 20, and the speeds 150, 154 are coincident.

In Step 670 the actuator 110 moves to the fourth position-Position D, wherein the system deploys the $2^{nd}$ gear locking elements 38B. At some period after point 178, after the locking element 38A connects and transfers forward torque between the first shaft 14 and the gear 36, the system deploys the locking element 38B of the fourth controllable one-way clutch or coupling assembly 133.

In step 675, if desired, the method determines if the locking element 38B is deployed. If not, the method returns to step 670. If the locking element 38B is deployed, the method proceeds to step 680. Whether the locking elements 38B are engaged or deployed may be determined by applying a negative or reverse torque to the first shaft 14, wherein speed and torque sensors monitor the respective parameters of the components.

In step 680 the system operates in $2^{nd}$ gear, the second gear assembly/ratio 20, in forward, reverse, and regeneration modes. In the regeneration mode the system provides regeneration torque—regenerative braking.

Continued movement of the cam actuator 110 moves the cam actuator 110 also includes a fifth position—Position E wherein all four locking elements 30A, 30B, 38A, 38B are disengaged/nondeployed, the system freewheels in both forward and reverse.

Figure 20:
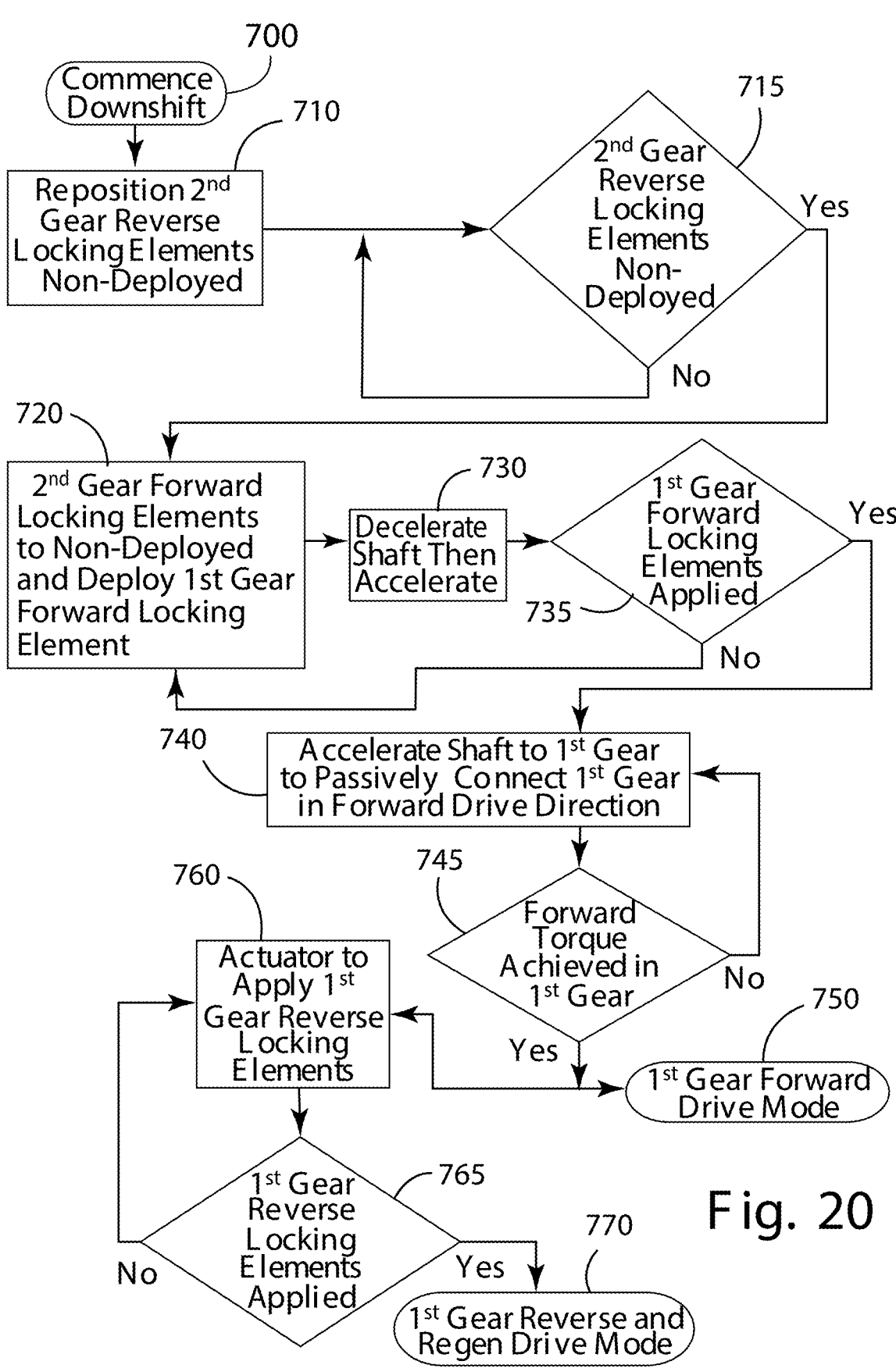
FIG. 20 is a flowchart of an example of a method of operation of a shift system for a power transmission assembly of FIGS. 13-17.
Figure 21:
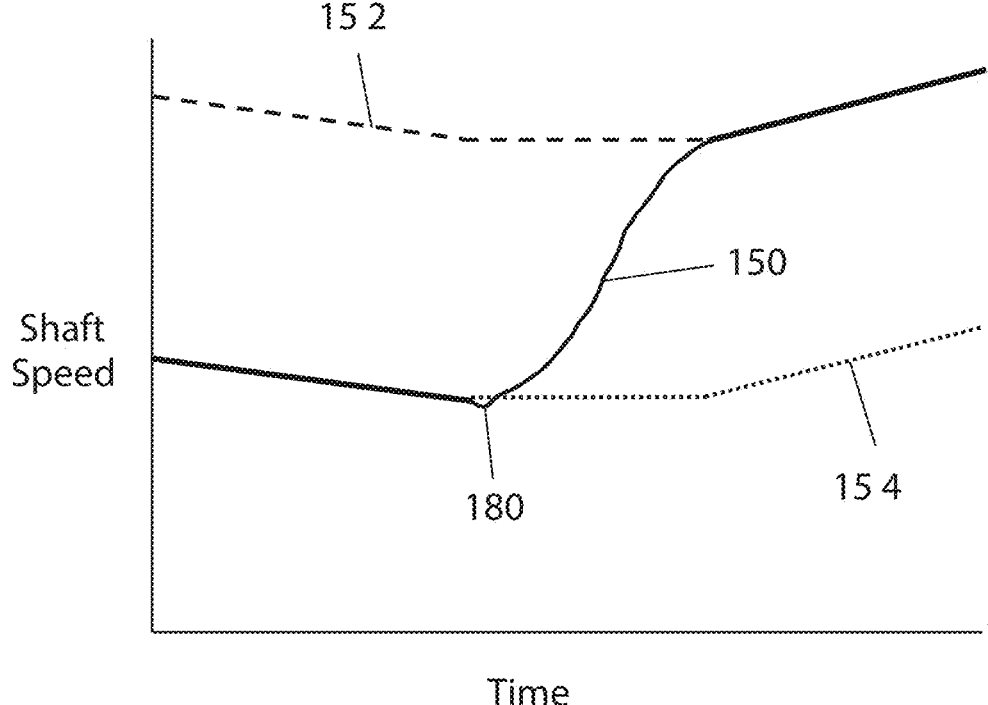
FIG. 21 speed over time diagram according to the method of FIG. 20.

FIG. 20 is a flowchart of another example of the inventive system and method showing a downshift from $2^{nd}$ gear to $1^{st}$ gear using the five-position, five-mode cam actuation mechanism 110. As illustrated, the power transmission system or assembly 10 downshifts from $2^{nd}$ gear forward propulsive torque to $1^{st}$ gear forward propulsive torque. FIG. 21 is a motor speed over time diagram illustrating the speed, solid line 150, of the first shaft 14, the speed, dashed line 152, of the gear 28, and the speed, dotted line 154, of the gear 36.

FIG. 20 shows the method begins in step 700 with a signal or command to commence a downshift from $2^{nd}$ gear forward to $1^{st}$ gear forward. Initially, the actuator is in the fourth position—Position D. The locking elements 38A, 38B of the controllable one-way clutches or coupling assemblies 31, 33 are deployed. Each extends outward from its respective pocket 32A, 32B of the pocket plate 32. The locking elements 30A, 30B of the controllable one-way clutches or coupling assemblies 21, 23 are nondeployed. Each locking element 30A, 30B remains in its respective pocket 24A, 24B. As shown in FIG. 21, the first shaft and gear 36 rotate together at the same speed 150, 154. The locking elements 30A, 30B transfer no torque from the first shaft 14 through the gear 28 to the first gear assembly/ratio 18.

In step 710, in preparation for the downshift, the actuator 110 rotates, moves to the third position—Position C, wherein the system repositions the locking elements 38B of the fourth controllable one-way clutch or coupling assembly 133 in a nondeployed position. Because the locking element 38A of the third controllable one-way clutch or coupling assembly 131 is still deployed, it couples the first shaft 14 and gear 36 in the forward direction. However, because the locking element 38A is still carrying forward torque, it remains in a deployed position and is still engaged. The speeds 150, 154 remain coincident because torque is in the forward direction through the locking element 38B.

Step 715, if desired, determines if the locking elements 38B are nondeployed. If not, the method returns to step 710. If the locking elements 38B are nondeployed, the method proceeds to step 720. Whether the locking elements 38B are engaged or deployed may be determined by applying a negative or reverse torque to the first shaft 14, wherein speed and torque sensors monitor the respective parameters of the components. In one example, momentarily, for a short period or blip, the speed 150 of the first shaft 14 decelerates below the speed 154 of the gear 36. Speed sensors monitor the speed 150 of the shaft 14 and the speed 154 of the gear 36. If the respective speeds 150, 154 remain the same, as the speed 150 of the shaft 14 decreases, then locking elements 38B may still be engaged.

In Step 720 the actuator 110 moves to the second position—Position B, wherein the system repositions the locking elements 38A of the third controllable one-way clutch or coupling assembly 133 in a nondeployed position and deploys the locking elements 30A of the second controllable one-way clutch or coupling assembly 121.

Step 730 both decelerates, then accelerates the speed 150 of the first shaft 14 above that of the speed 154 of the gear 36 of the second gear assembly/ratio 20. FIG. 21 shows the speed 150 of the first shaft 14 decelerating slightly below the speed 154 of the gear 36 of the second gear assembly/ratio 20 at point 180 and then accelerating to above the speed 154. The deceleration is for a brief period or blip, wherein the forward locking elements 38A disengage. Decelerating the speed 150 of the first shaft 14 removes torque, allowing repositioning of the forward locking elements 38A to a nondeployed position. For example, the force of the return biasing member or spring 61B acts on the locking element 38A once the torque is removed to move it to the nondeployed position.

Step 735, if desired, determines if the locking elements 38A are nondeployed. If not, the method returns to step 720. If the locking elements 38A are nondeployed, the method proceeds to step 730. Whether the locking elements 38A are engaged or deployed may be determined by applying a positive or forward torque to the first shaft 14, wherein speed and torque sensors monitor the respective parameters of the components. In one example, speed sensors monitor the speed 150 of the shaft 14 and the speed 154 of the gear 36. If the respective speeds 150, 154 remain the same as the speed 150 of the shaft 14 increases, then locking elements 38A may still be engaged.

Step 740 continues to accelerate the speed 150 of the first shaft 14. FIG. 21 shows the speed 150 of the first shaft 14 accelerates from point 180, above the speed 150 of the first shaft 14 and the speed 154 of the gear 36. Because the speed 150 is below the speed 152 of the gear 28, the gear 28 is rotating faster than the shaft 14, and there is no forward torque on deployed locking element 30A; it is in an overrun state. Step 740 continues to accelerate the speed 150 of the first shaft 14 to the speed 152 of the gear 28 to couple the first shaft 14 and gear 28. FIG. 21 shows the speed 150 of the first shaft 14 converging on and reaching the speed 152 of the gear 28 at point 182. Once the speed 150 of the first shaft 14 reaches the speed 152 of the gear 28, the already deployed locking element 30A of the first one-way clutch or coupling assembly 121 engages the notch 26A to passively couple the shaft 14 to the gear 28 and transfer torque. With the first shaft 14 connected to the gear 28, the gear 28 rotates at the same speed as the first shaft 14. The speeds 150, 152 are equal, and the solid and dashed lines are coincident.

In step 745, if desired, the method determines if the locking elements 30A are engaged or deployed. If not, the method returns to step 730. If the locking elements 30A are engaged or deployed, the method proceeds to step 740 and step 750. The determination may include applying a positive or forward torque to the first shaft 14, wherein speed and torque sensors monitor the respective parameters of the components.

In step 750, the system operates in the first gear assembly/ratio 18 in the forward mode. As shown in FIG. 21, the first shaft 14 rotates at the same forward speed as the gear 28 of the first gear assembly/ratio 18, and the lines 150 and 152 are coincident.

In step 760, the actuator 110 moves to the first position—Position A, wherein the system deploys the locking elements 30B associated with $1^{st}$ gear reverse once the respective speeds 150, 152 of the shaft 14, and the gear 28 are synchronized. The locking elements 30B of the second controllable one-way clutch or coupling assembly 123 are deployed and engage respective notches 34B in the notch plate, connected to or part of the gear 28, coupling the first shaft 14 and the gear 28.

In step 765, if desired, the method determines if the locking elements 30B associated with the first gear assembly/ratio 18 are deployed. If not, the method returns to step 750. If the locking elements are deployed, the method proceeds to step 760. The determination may include applying a negative or reverse torque to the first shaft 14. In step 760 the system operates in $1^{st}$ gear regeneration mode.

Figure 22:
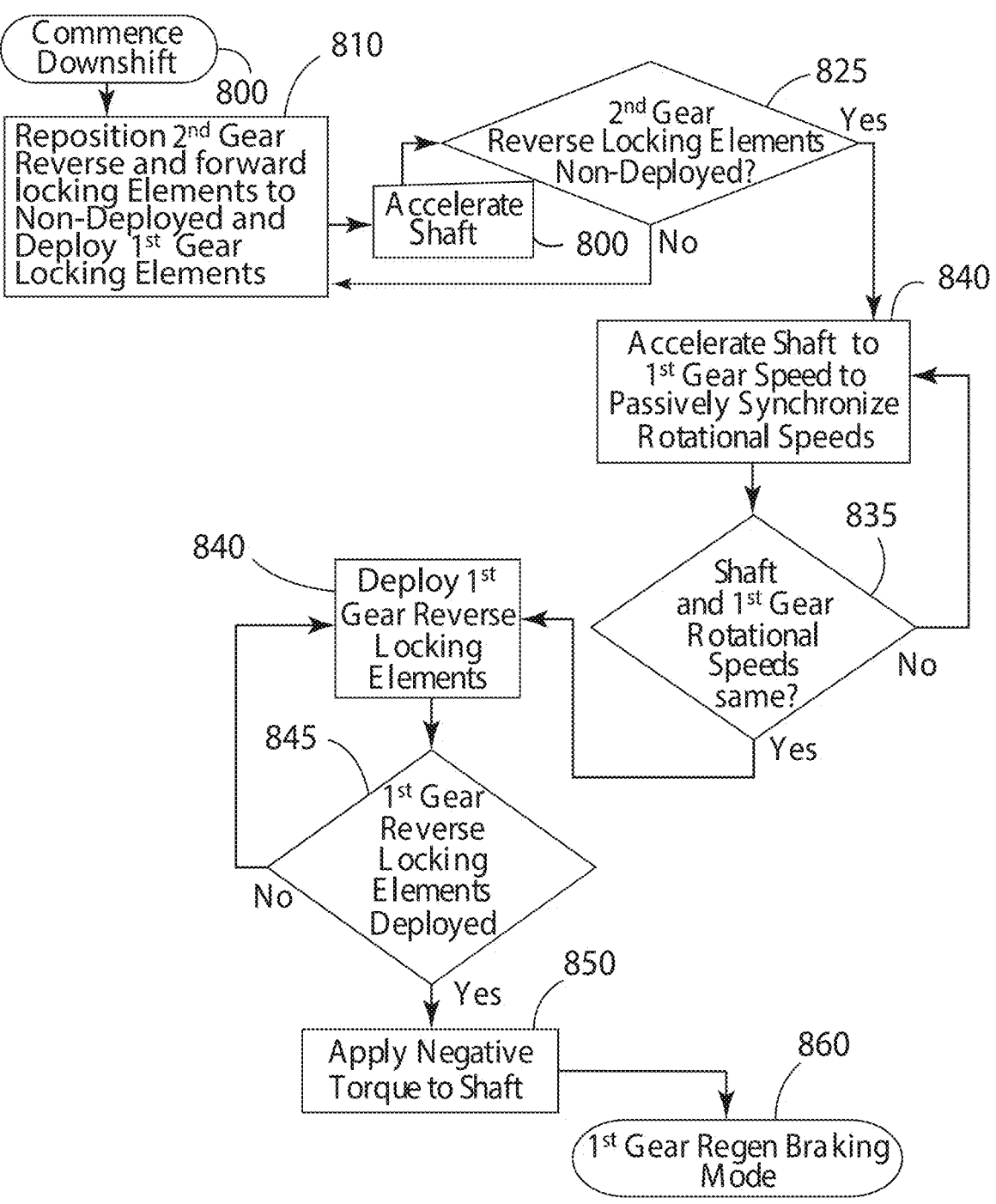
FIG. 22 is a flowchart of an example of a method of operation of a shift system for a power transmission assembly of FIGS. 13-17.
Figure 23:
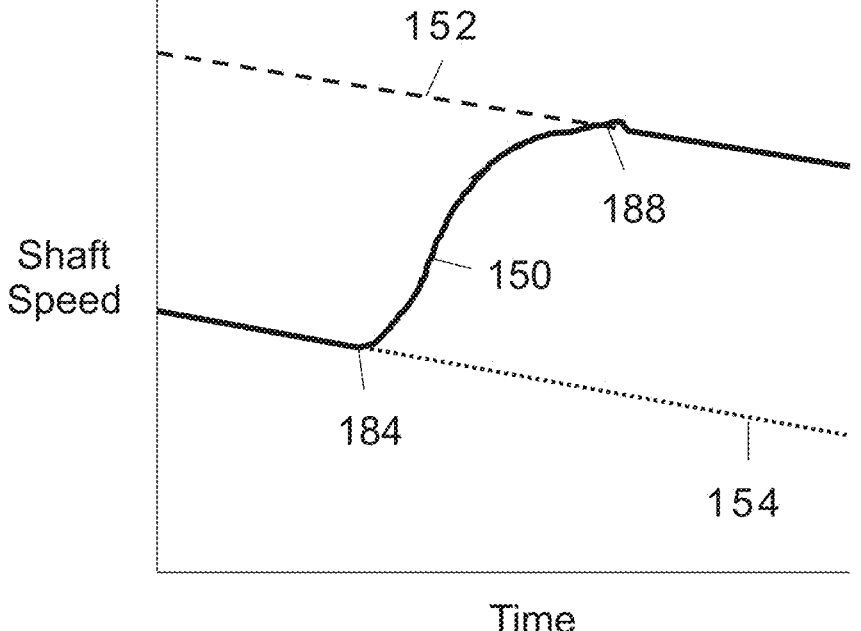
FIG. 23 speed over time diagram according to the method of FIG. 22.

Referring to the drawings, FIG. 22 is a flowchart of one example of the inventive system and method showing a downshift from $2^{nd}$ gear to $1^{st}$ gear, wherein the power transmission system or assembly 10 downshifts from $2^{nd}$ gear regenerative torque—regenerative braking to $1^{st}$ gear regenerative torque—regenerative braking. FIG. 23 is a speed over time diagram illustrating the speed, solid line 150, of the first shaft 14, the speed, dashed line 152, of the gear 28, and the speed, dotted line 154, of the gear 36.

FIG. 22 shows the method begins in step 800 with a signal or command to commence a downshift from $2^{nd}$ regenerative torque—regenerative braking to $1^{st}$ gear regenerative torque—regenerative braking. Initially, the actuator 110 is in the fourth position—Position D. The locking elements 38A, 38B of the second and third controllable one-way clutches or coupling assemblies 131, 133 are deployed and transfer forward and regenerative torque. As shown in FIG. 23, because the locking elements 38A, 38B are deployed, the speed 150 of the shaft 14 and the speed 154 of the gear 36 are the same, and the solid line and dotted lines are coincident.

In step 810, in preparation for the downshift, the actuator 110 rotates, moves to the second position—Position B, bypassing Position C. In Position B, both of the locking elements 38A, 38B are repositioned from the initial deployed position to a nondeployed position, and the locking elements 30A associated with forward torque are repositioned from the nondeployed position to a deployed position. However, because the locking element 38B is still carrying reverse torque, it may remain in a deployed position and still engaged.

In step 820 the system accelerates the speed 150 of the first shaft 14 to remove torque and reposition the reverse locking elements 38B to a nondeployed position. FIG. 23 shows the speed 150 of the first shaft 14 starts to accelerate above the speed 154 of the second gear at point 184. Increasing the speed 150 of the first shaft 14 removes forward torque and enables the reverse locking element 38B to disengage. For example, the force of the return biasing member or spring 61B acts on the locking element 38B once the torque is removed to move it to the nondeployed position.

In step 825 the method determines if the locking elements 38B are nondeployed. If not, the method returns to step 820. If the locking elements 38B are nondeployed, the method proceeds to step 830. Whether the locking elements 38B are engaged or deployed may be determined by applying a negative or reverse torque to the first shaft 14, wherein speed and torque sensors monitor the respective parameters of the components.

Step 830 accelerates the speed 150 of the first shaft 14 to the speed 152 of gear 28, wherein the locking element 30A passively engages and couples the first shaft 14 and the gear 28. FIG. 23 shows the speed 150 of the first shaft converging on the speed 152 of the gear 28 at point 188. Once the speed 150 of the first shaft 14 reaches the speed 152 of the gear 28, the locking element 30A of the passive one-way clutch or coupling assembly 21 engages, couples the two, and enables torque transfer for forward propulsion. Increasing the speed 150 of the first shaft 14 correspondingly increases the speed of the gear 28, and the solid line and dashed lines are coincident.

In step 835 the method determines if the rotational speeds of the first shaft 14 and gear 28 are the same. If not, the method returns to step 840. If the speeds match, the method proceeds to step 850.

In step 840, the actuator 110 moves to the first position—Position A, wherein the system deploys the locking elements 30B associated with $1^{st}$ gear reverse once the respective speeds 150, 152 of the shaft 14 and gear 28 synchronize, wherein the locking element 30A passively couples the first shaft 14 and gear 28. When the speeds 150, 152 of the first shaft 14 and the gear 28 are the same or synchronized, the actuator 110 moves to the first position—Position A, and the locking elements 30B of the first controllable one-way clutch or coupling assembly 23 are deployed. As shown in FIG. 23, the speed of the shaft 14 increases slightly, blips upward, providing forward torque and enabling the locking elements 30B to engage respective notches 34B in the notch plate, connected to or part of the gear 28 coupling the first shaft 14 and the gear 28.

In step 845, the method determines if the locking elements 30B associated with the first gear assembly/ratio 18 are deployed. If not, the method returns to step 840. If the locking elements are deployed, the method proceeds to step 850.

In Step 850 the system applies a negative or reverse torque to the first shaft 14. The negative or reverse torque resulting from the second shaft 16 driving the first gear assembly/ratio 18 and, correspondingly, the first shaft 14.

In step 860 the system operates in $1^{st}$ gear regeneration mode.

Figure 24:
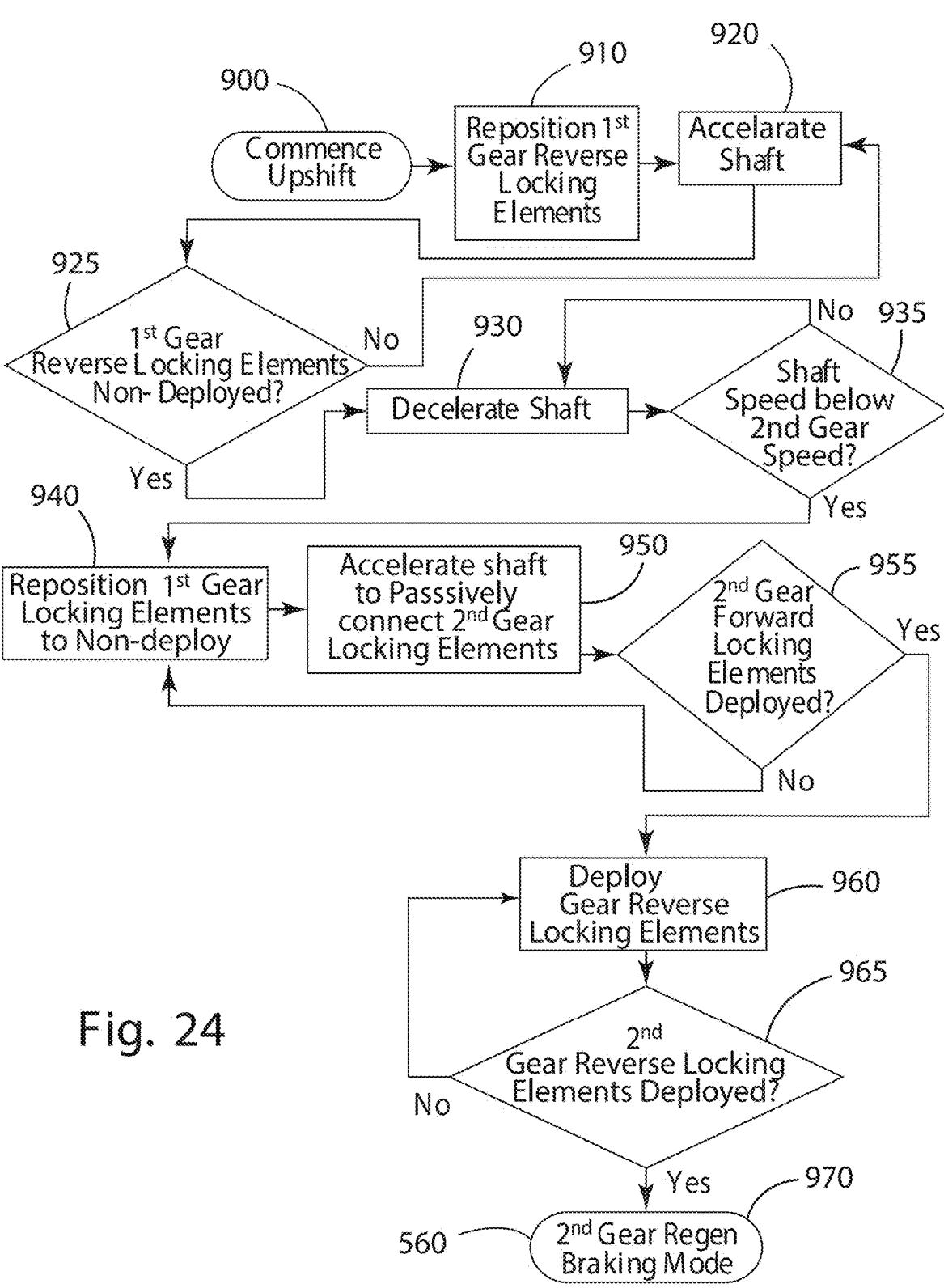
FIG. 24 is a flowchart of an example of a method of operation of a shift system for a power transmission assembly of FIGS. 13-17.
Figure 25:
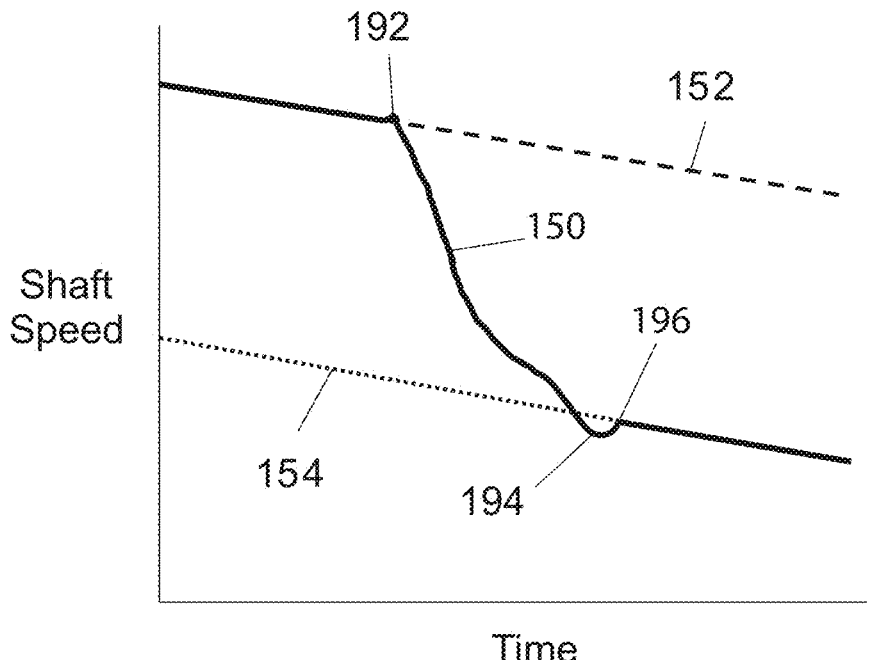
FIG. 25 speed over time diagram according to the method of FIG. 24.

FIG. 24 is a flowchart of one example of the inventive system and method illustrating an upshift from $1^{st}$ gear to $2^{nd}$ gear, wherein the power transmission system or assembly 10 upshifts from $1^{st}$ gear regenerative torque—regenerative braking to $2^{nd}$ gear regenerative torque—regenerative braking. FIG. 25 is a speed over time diagram illustrating the speed, solid line 150, of the first shaft 14 speed, dashed line 152, of the gear 28, and the speed, dotted line 154, of gear 36.

FIG. 24 shows the method begins in step 900 with a signal or command to commence an upshift from $1^{st}$ gear regenerative torque—regenerative braking to $2^{nd}$ gear regenerative torque—regenerative braking. Initially, the actuator 110 is in the first position—Position A. The forward locking elements 30A of the first one-way clutch or coupling assembly 121 and the reverse torque transmitting locking element 30B of the controllable one-way clutch or coupling assembly 123 are deployed and transfer both forward and reverse regenerative torque. The locking elements 38A, 38B of the one-way clutches or coupling assemblies 131, 133 are nondeployed. Each locking element 38A, 38B remains in its respective pocket 32A, 32B. The locking elements 38A, 38B transfer no torque from the first shaft 14 through the gear 36 to the second gear assembly/ratio 20. Because the locking elements 30A, 30B are deployed, the speed 150 of the shaft 14 and the speed 152 of the gear 28 are the same, and the solid line and the dashed lines are coincident.

In step 910, in preparation for the upshift from $1^{st}$ to $2^{nd}$ gear, the actuator moves to the second position—Position B. The locking elements 30B are repositioned from the initial deployed position to a nondeployed position. In Position B, the locking element 30A of the first controllable one-way clutch or coupling assembly 121 remains deployed and capable of transferring torque in the forward direction. However, because the locking element 30B is still carrying torque it may remain in a deployed position and still engaged.

In step 920 the system accelerates the speed 150 of the first shaft 14 to a point 192 above the speed 152 of the gear 28, wherein the speed 150 of the first shaft 14 and the speed 152 of the gear 28 diverge, with the speed of the shaft 14 increasing above the speed of the gear 28 for a brief period. The speed 150 of the shaft 14 blips above the speed 152 of the gear 28 to remove torque on the locking element 30B, allowing disengagement. The force of the return biasing member or spring 59B acts on the locking element 30B once the torque is removed to move it to a nondeployed position.

Step 925 determines if the locking elements 30B are nondeployed. If not, the method returns to step 920. If the locking elements 30B are nondeployed, the method proceeds to step 930.

Step 930 decelerates the speed 150 of the first shaft 14 from the speed 152 of the gear 28 to below the speed 154 of the gear 36 of the second gear assembly/ratio 20. The speed 150 of the first shaft 14 continues to decelerate from point 192 until it falls under the speed 154 of the gear 36, and in the example shown in FIG. 25 reaches point 194. Under means less than the speed of the gear 36. As set forth above, under means an amount greater than 50 RPM. For example, the speed 154 of the first shaft 14 is at least 50 RPM less than the speed 150 of the gear 36. Although currently deployed, there is no torque on locking element 30A and it will overrun.

In step 935 the method determines if the speed of the first shaft 14 is below that of the gear 36. If not, the method returns to step 530. If the speed is below, the method proceeds to step 940.

In step 940, the actuator 110 moves to the third position—Position C, wherein the system deploys the locking elements 38A of the controllable one-way clutch or coupling assembly 131 used for forward propulsion torque in the $2^{nd}$ gear and repositions the locking elements 30A of the controllable one-way clutch or coupling assembly 121 used for forward propulsion torque in the $1^{st}$ gear to nondeployed. As shown in FIG. 25, the speed 150 of the shaft 14 is, at point 194, below the speed 152, 154 of the gears 28, 36. Because the speed 150 is below the speed 152 of the gear 28, the gear 28 is rotating faster than the shaft 14, so there is no forward torque on locking element 30A; it is in an overrun state and can be repositioned to nondeployed. Likewise, because the speed 150 of the shaft 14 is below the speed 154 of the gear 36, the gear 36 rotates faster than the shaft 14, so there is no forward torque on locking element 38A; it can be deployed and is in an overrun state.

Step 950 accelerates the speed 150 of the first shaft 14 to the speed 154 of the gear 36 of the second gear assembly/ratio 20. FIG. 25 shows the speed 150 of the first shaft 14 increasing, reaching, and synchronizing with the speed 154 of the gear 36 of the second gear assembly/ratio 20 at point 196. Because the locking elements 38A are deployed, once the speed 150 of the first shaft 14 reaches or equals the speed 154 of the gear 36 at point 196, the locking elements 38A automatically couple the shaft 14 to the second gear assembly/ratio 20 by engaging respective notches 34A in the notch plate, which is connected to or part of the gear 36. The locking element 38A functions passively because it passively connects and begins to transfer torque between the first shaft 14 and the gear 36, wherein the gear 36 rotates at the same speed as the first shaft 14. As shown in FIG. 25, the speeds 150, 154 of the shaft 14 and gear 36 are coincident. While shown as discreet points, 192, 194, 196 they are not necessarily discrete points but may encompass a range.

In step 955, if desired, the method determines if the locking elements 38A are engaged or deployed. If not, the method returns to one of steps 940 or 950. If the locking elements 38A are engaged or deployed, the method proceeds to step 960. Whether the locking elements 38A are engaged or deployed may be determined by applying a positive or forward torque to the first shaft 14, wherein speed and torque sensors monitor the respective parameters of the components.

In Step 960 the actuator 110 moves to the fourth position—Position D, wherein the system deploys the $2^{nd}$ gear locking elements 38B. At some period after point 196, after the locking element 38A connects and transfers forward torque between the first shaft 14 and the gear 36, the system deploys the locking elements 38B of the fourth controllable one-way clutch or coupling assembly 133.

In step 965, if desired, the method determines if the locking element 38B is deployed. If not, the method returns to step 960. If the locking element 38B is deployed, the method proceeds to step 970. Whether the locking elements 38B are engaged or deployed may be determined by applying a negative or reverse torque to the first shaft 14, wherein speed and torque sensors monitor the respective parameters of the components.

In step 970 the system operates in $2^{nd}$ gear, the second gear assembly/ratio 20, in forward, reverse, and regeneration modes. In the regeneration mode the system provides regeneration torque—regenerative braking.

If desired, the cam actuator 110 moves to the fifth position—Position E, wherein all four locking elements 30A, 30B, 38A, 38B are disengaged/nondeployed. In Position E, the power transmission system or assembly 10 freewheels in both forward and reverse. Because the power transmission system or assembly 10 uses controllable one-way clutches or coupling assemblies 121, 123, 131, 133, the power transmission system or assembly 10 includes an additional mode wherein all the clutches are turned off, the locking elements 30A, 30B, 38A, 38B all in a nondeployed position, no torque is transferred and the respective components freewheel with respect to one another.

Figure 26:
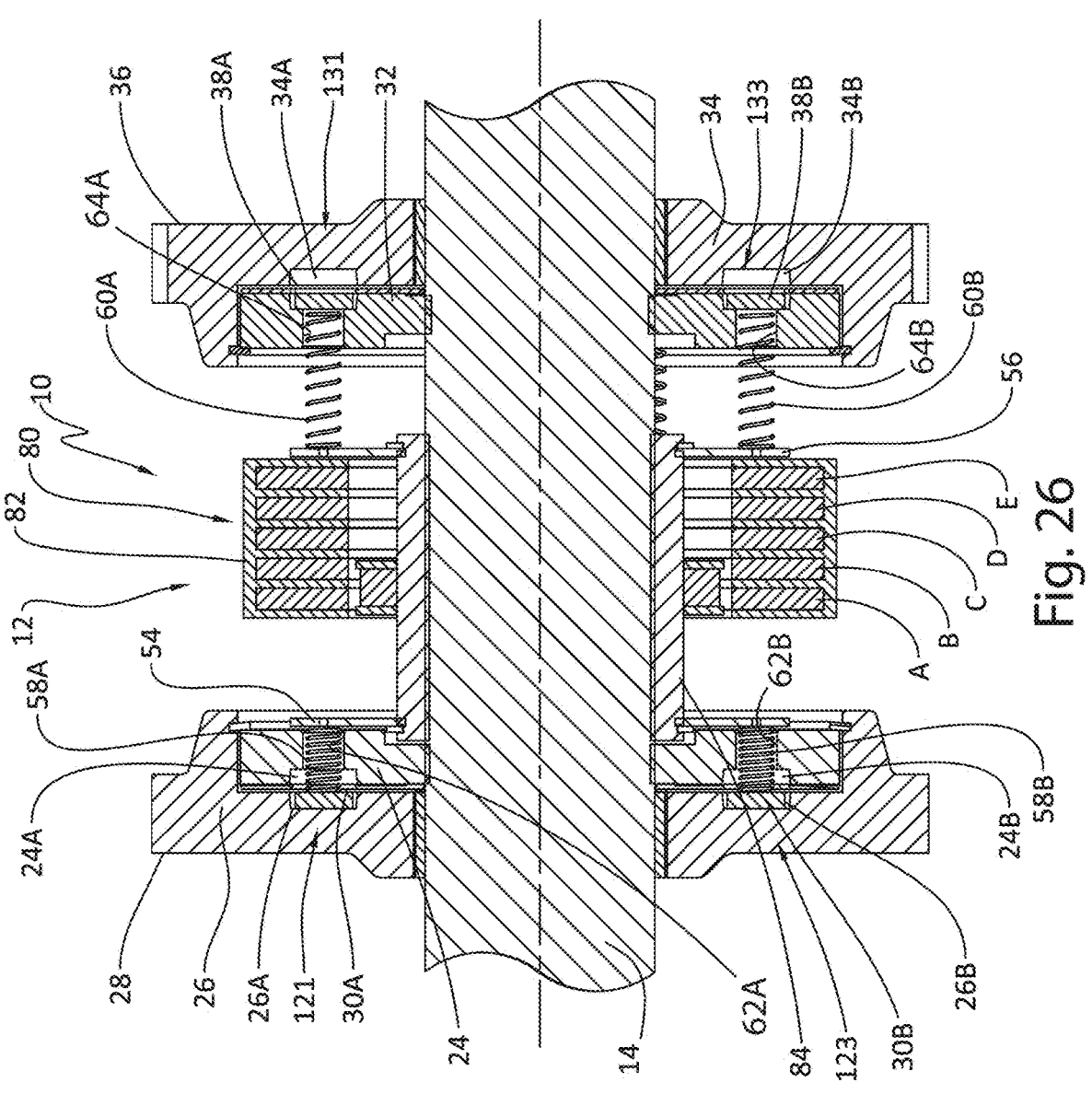
FIG. 26 is a schematic cross-sectional view illustrating another example of a shift system and mechanism for use with the power transmission system of FIG. 1.

FIG. 26 illustrates another additional example of the power transmission system or assembly 10 including the shift system 12 having a five-position actuator 80, illustrated as a linear actuator using a stator 82 and a translator 84. The power transmission system or assembly 10 provides the following system modes based on the position of the actuator 80. Position A provides 1st gear forward, reverse, and regenerative torque. Position B provides 1st gear forward torque and overruns when the gear 28 rotates faster than the first shaft 14. Position C provides a neutral position. Position D provides 2nd gear forward torque and overruns when the gear 36 rotates faster than the first shaft. Position E provides 2nd gear forward, reverse, and regenerative torque. Like the cam actuator 110, the first and second active or controllable clutches or assemblies 121, 123 act on the locking elements 30A, 30B, and third and fourth active or controllable clutches or assemblies 131, 133 act on the locking elements 38A, 38B.

The position of the actuator controls, through respective active or controllable clutch assemblies 121, 123, 132, 133, the positions deployed or nondeployed of the respective locking elements 30A, 30B, 38A, 38B. The positions of the locking elements associated with the actuator 80 correspond to the actuator 80 positions as follows: Position A—both locking elements 30A, 30B are deployed and both locking elements 38A, 38B are nondeployed; Position B—locking element 30A is deployed and locking elements 30B, 38A, 38B are nondeployed; Position C—locking elements 30A, 30B, 38A, 38B are all nondeployed; Position D—locking elements 30A, 30B, 38B are nondeployed and locking elements 38A are deployed; and Position E—locking elements 30A, 30B are nondeployed and locking element 38A, 38B are deployed.

The linear actuator 80 differs from the cam actuator 110 in that the neutral position in the linear actuator 80 is located between Position B and Position C. The neutral position, Position E of the cam actuator 11 may be located at either end of the cam profile or in the middle.

Figure 27:
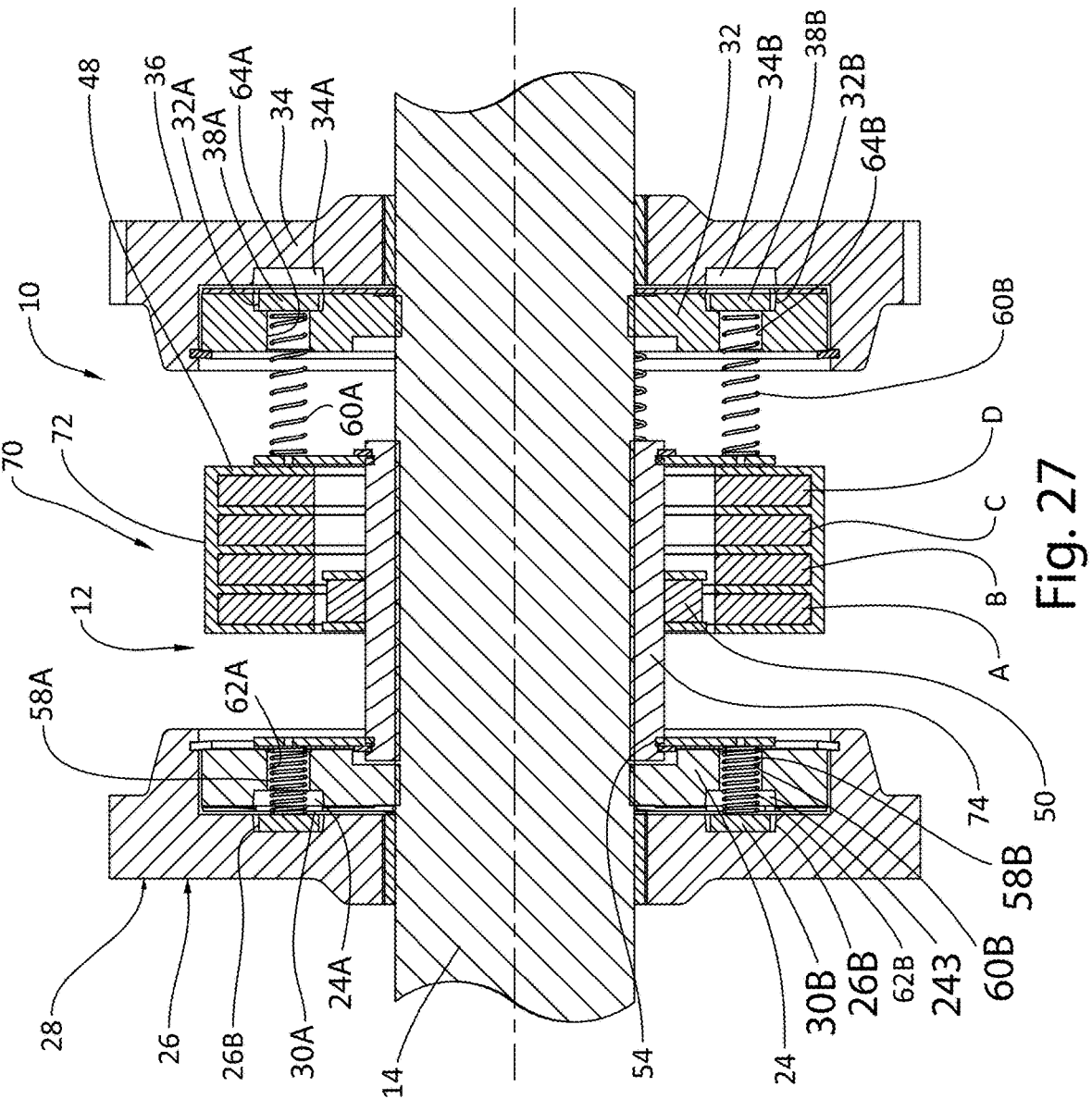
FIG. 27 is a schematic cross-sectional view illustrating yet another example of a shift system and mechanism for use with the power transmission system.

FIG. 27 illustrates another example of an additional example of the power transmission system or assembly 10, including the shift system 12 having a four-position actuator 70, illustrated as a linear actuator using a stator 72 and a translator 74. The actuator moves between four positions, represented by the letters A-D. The fourth position—Position D, located between Position B and Position C, is an additional, neutral position. In the neutral position, the coupling mechanism 22 freewheels in both the forward and reverse direction. The coupling system differs from that used with the three-position actuator 40 in that the one-way clutches or coupling assemblies 21, 23, controlling the deployment of locking elements 30A, 30B, are both active, controllable elements. The locking elements 38A, 38B of the second and third controllable one-way clutches or coupling assemblies 31, 33 are both active, controllable elements. Making the forward torque locking element 30A active instead of passive provides the shift system 12 with a neutral or freewheeling position in both forward and reverse directions. In the first position—Position A, both locking elements 30A, 30B are engaged/deployed, while the locking elements 38A, 38B are disengaged/nondeployed. In the second position—Position B, the locking element 30A remains engaged/deployed, with locking element 30B now disengaged/nondeployed, and locking elements 38A, 38B remain disengaged/nondeployed. In the second position—Position B, the locking element 30A transfers torque and overruns, allows coasting in a forward direction in 1st gear—when the gear 28 rotates faster than the first shaft 14. In the third position—Position C, the locking elements 30A, 30B are disengaged/nondeployed, and the locking elements 38A, 38B are engaged/deployed to provide 2nd gear forward, reverse, and regenerative torque. In the fourth position—Position D, all four locking elements 30A, 30B, 38A, 38B are disengaged/nondeployed, and the system free-wheels in both forward and reverse.

Another example of the power transmission system or assembly 10 includes the shift system 12, having a four-position actuator without a neutral position. Like the foregoing example, in the first position—Position A, both locking elements 30A, 30B are engaged/deployed while the locking elements 38A, 38B are disengaged/nondeployed. In the second position—Position B, locking element 30A remains engaged/deployed, locking element 30B is now disengaged/nondeployed, and locking elements 38A, 38B remain disengaged/nondeployed. In second position—Position B, the locking element 30A transfers torque and over-runs, allows coasting in a forward direction in 1st gear-when the gear 28 rotates faster than the first shaft 14. In the third position—Position C, the locking elements 30A, 30B are disengaged/nondeployed, and the locking elements 38A, 38B are engaged/deployed to provide 2nd gear forward, reverse, and regenerative torque. In the fourth position—Position D, the locking element 38A is engaged/deployed, and the locking element 38B is disengaged/nondeployed. In the fourth position—Position D, the locking element 30A transfers torque and overruns, allows coasting in a forward direction in 2nd gear—when the gear 36 on the first shaft 14 rotates faster than the first shaft 14.

Figure 28:
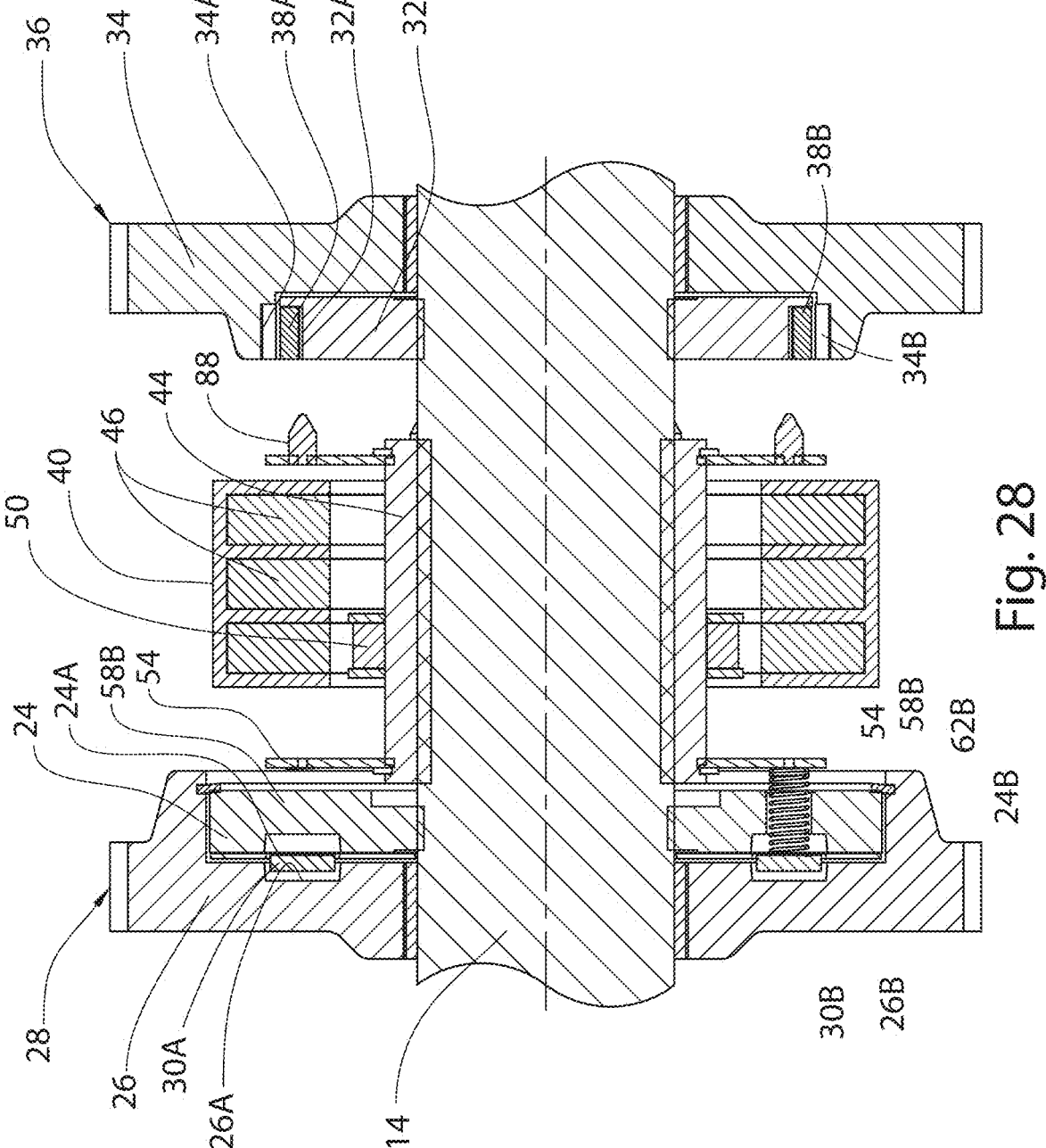
FIG. 28 is a schematic cross-sectional view illustrating a further example of a system and mechanism for use with the power transmission system.

FIG. 28 illustrates another example of the power transmission system or assembly 10 having a shift system 12 using a three-position linear actuator 40. The linear actuator includes a stator and translator operative to move linearly in the direction of the longitudinal axis of the first shaft 14. The linear actuator operative to move the respective active locking elements 30B, 38A, 38B between an engaged/deployed position and a disengaged/nondeployed position. The locking element 30A remains in an engaged/deployed position and is a passive locking element. As shown, the locking elements 38A, 38B extend radially out of the pockets 32A, 32B, with the locking element 38A and the pocket 32A shown for illustrative purposes. The linear actuator 40 includes a plunger 88 or other cam mechanism that moves axially, in the direction of the longitudinal axis of the first shaft 14 and engages the locking elements 38A, 38B to move the locking elements 38A, 38B in a radial direction, transverse the direction of the longitudinal axis of the first shaft 14. While the locking elements 30A, 30B are shown in a planar configuration, moving in the direction of the longitudinal axis of the first shaft, one or both could also be positioned radially.

Figure 29:
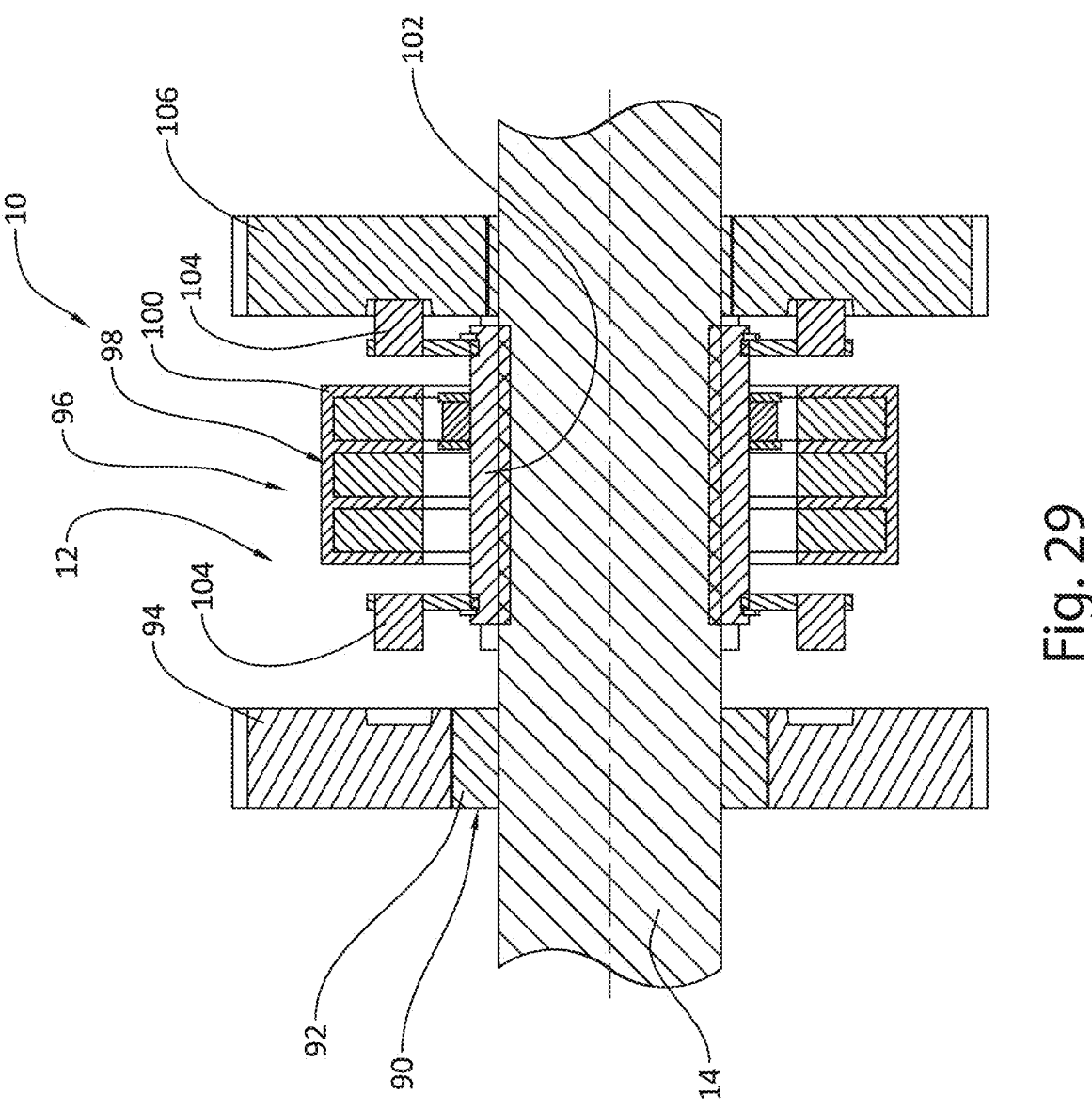
FIG. 29 is a schematic cross-sectional view illustrating another additional example of a system and mechanism for use with the power transmission system.

FIG. 29 illustrates the power transmission system or assembly 10 having a shift system 12 using a three-position actuator with a one-way clutch and dog clutch combination. The one-way clutch 90 may include a sprag or roller one-way clutch 92 between the gear 94 and the first shaft 14. The gear 94, through the sprag or roller one-way clutch 92, transfers torque in one direction and freewheels in the opposite direction. An actuator 96, for example, a linear actuator 98 having a stator 100 and a translator 102 acts on or moves a dog clutch 104 into engagement with and couples the gears 94, 106 to the first shaft 14. In operation, $1^{st}$ gear forward torque is provided through the sprag or roller one-way clutch 92, while $1^{st}$ gear reverse torque is provided when the dog clutch 104 moves to the left and couples the gear 94 to the first shaft 14. $2^{nd}$ gear forward and reverse torque is provided when the dog clutch 104 moves to the right and couples the gear 106 to the first shaft 14.

Various types of actuators may be used with the shift system, including a linear actuator, a cam actuator, or a linear actuator with a shift fork.

Figure 30:
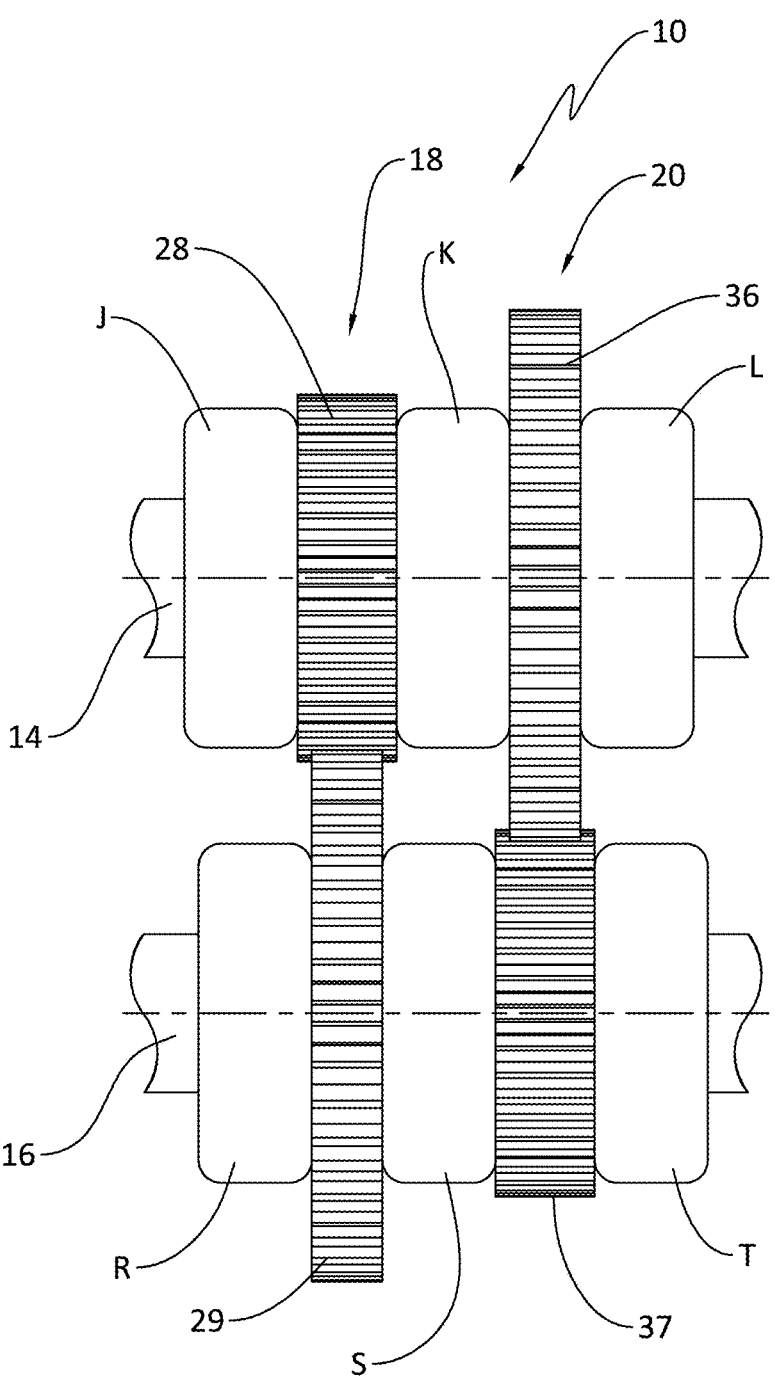
FIG. 30 schematically illustrates multiple clutch locations and positioning for use with the power transmission system.

FIG. 30 schematically illustrates that the locations of the coupling assemblies 21, 23, 31, 33 with respect to the first gear assembly/ratio 18 and second gear assembly/ratio 20 may vary. In the foregoing examples, the coupling assemblies 21,23, 31, 33 are combined and located at position K on the shaft 14 between the gear 28 and gear 36. The combined coupling assemblies 21,23, 31, 33 may also be located at position S, on the shaft 16 between the gear 29 and the gear 37. It is also contemplated that the coupling assemblies 21, 23, 31, 33 may be separated with the coupling assemblies 21, 23 on the input or first shaft 14 and the coupling assemblies 31, 33 on the output or second shaft. For example, the assemblies 21, 23 associated with the $1^{st}$ gear assembly/ratio 18 may be located at positions J, K, R, and S, and the coupling assemblies 31, 33 associated with the $2^{nd}$ gear assembly/ratio 20 may be located at positions K, L, S, and T. In addition, the first controllable one-way clutch or coupling assembly 21 may be located on the first shaft 14, with the second controllable one-way clutch or coupling assembly 23 on the second shaft 16. The third controllable one-way clutch or coupling assembly 31 may be on the first shaft 14, and the fourth controllable one-way clutch or coupling assembly 33 on the second shaft 16. Further, the individual locking elements 30A, 30B, 38A, 38B and their associated one-way clutch assemblies may be separated individually and placed independently at various positions. In another example, the locking element 30A and associated one-way clutch assembly at position J, the locking element 30B and associated one-way clutch assembly at position S, the locking element 38A and associated one-way clutch assembly at position K, and the locking element 38B and associated one-way clutch assembly at position L. The foregoing are examples of the multiple placements or arrangements of the one-way clutches or coupling assemblies 21, 23, 31, 33.

In one example, the shift system 12 of the power transmission system or assembly 10 uses a locking element or strut-based passive one-way clutch with the $1^{st}$ gear node in combination with a locking element or strut-based clutch for the $2^{nd}$ gear node, without using friction clutches. In another example, the assembly utilizes a one-way clutch in multi-speed transmission using only mechanical locking element shifting. For example, one-way clutch technologies including roller or sprag one-way clutches in combination with dog clutches.

The shift system 12 of the power transmission system or assembly 10 uses a passive locking element to enable a shift from a $1^{st}$ gear. The passive locking element provides an overrun, wherein torque is transmitted from an input member in a forward direction while allowing overrun. The system uses an active one-way clutch to disengage a locking element of a second clutch used with a $2^{nd}$ gear. The system includes an actuator that engages and disengages the locking element of the second clutch.

The shift system includes a passive clutch with a passive locking element operative to connect an input member to a $1^{st}$ gear and a controllable clutch with a controllable locking element operative to connect the input member to a $2^{nd}$ gear. The foregoing are illustrative examples of locking element conditions based on vehicle shift patterns, including upshifts or downshifts, of the shift system 12 of the power transmission system or assembly 10. Other locking element conditions for shift patterns involving various vehicle movement directions, either forward or reverse, and combinations of forward and regenerative torque are achievable. One example is an upshift from $1^{st}$ gear propulsive torque to $2^{nd}$ gear regenerative torque.

As shown, the shift system 12 may include multiple types of actuators, including linear actuators, cam actuators, and shift fork actuators. The actuators may also be dynamically controllable actuators or controllable mechanical diode actuators using selector plates. The actuators may be multiple positions actuators having, for example, three, four, and five positions. In addition, sprag or roller one-way clutches may be used with dog clutches, dynamically controllable clutches, or controllable mechanical diode actuators. Further, the locking elements may extend radial or planar.

The description of the invention is merely exemplary in nature. Thus, variations that do not depart from the gist of the invention are intended to be within the scope of the invention. Such variations are not to be regarded as a departure from the spirit and scope of the invention.

What is claimed is:

1. A power transmission method comprising:
providing a first shaft, the first shaft rotatable at a variable rotation speed;
providing a second shaft, the second shaft rotatable at a variable rotation speed;
providing a gear assembly between the first shaft and the second shaft, the gear assembly including at least a first gear ratio and a second gear ratio;
providing a first coupling assembly enabling torque transfer from the first shaft to the second shaft through the first gear ratio, the first coupling assembly including a notch plate, a pocket plate, and a locking element in a deployed position;
providing a second coupling assembly enabling torque transfer from the first shaft to the second shaft through the second gear ratio, the second coupling assembly including a notch plate, a pocket plate, and a locking element movable between a deployed and nondeployed position; and
varying the speed of the first shaft in the same direction of rotation to select one of the first gear ratio and the second gear ratio, wherein deployment of the locking element of the second coupling assembly is based on the speed of the first shaft.

2. The power transmission method of claim 1 wherein:
the step of varying the speed of the first shaft includes controlling the speed of the first shaft to engage the locking element of the second coupling assembly.

3. The power transmission method of claim 1 including the step of:
transferring no torque through the first gear ratio when the locking element of the second coupling assembly is deployed.

4. The power transmission method of claim 1 including the step of:
providing a third coupling assembly including a torque transmitting locking element; and
deploying the torque transmitting locking element of the third coupling assembly and enabling torque from the first shaft to the second shaft in the first gear ratio or from the second shaft to the first shaft in the first gear ratio.

5. The power transmission method of claim 1 including the step of:
providing a fourth coupling assembly including a torque transmitting locking element; and
deploying the torque transmitting locking element of the fourth coupling assembly and enabling torque from the first shaft to the second shaft in the second gear ratio or from the second shaft to the first shaft in the second gear ratio.

6. The power transmission method of claim 1 wherein:
the step of varying the speed of the first shaft includes reducing the speed of the first shaft until the speed of the first shaft synchronizes with the speed of the second gear ratio; and
moving the locking element of the second coupling assembly to a deployed position after the speed of the first shaft synchronizes with the speed of the second gear ratio.

7. The power transmission method of claim 1 wherein:
the step of varying the speed of the first shaft includes reducing the speed of the first shaft until the speed of the first shaft is below the speed of the second gear ratio;
moving the locking element of the second coupling assembly to the deployed position; and
increasing the speed of the first shaft to engage the locking element of the second coupling assembly.

8. The power transmission method of claim 1 including the step of:
reducing the speed of the first shaft until the speed of the first shaft is below the speed of the second gear ratio to disengage the locking element of the second coupling assembly;
moving the locking element of the second coupling assembly to the nondeployed position; and
increasing the speed of the first shaft to engage the locking element of the first coupling assembly.

9. A power transmission method comprising:
providing a first shaft, the first shaft rotatable at a variable rotation speed;
providing a second shaft, the second shaft rotatable at a variable rotation speed;
providing a gear assembly between the first shaft and the second shaft, the gear assembly including at least a first gear ratio and a second gear ratio;
providing a first coupling assembly enabling torque transfer from the first shaft to the second shaft through the first gear ratio, the first coupling assembly including a notch plate, a pocket plate, and a locking element in a deployed position;
providing a second coupling assembly enabling torque transfer from the first shaft to the second shaft through the second gear ratio, the second coupling assembly including a notch plate, a pocket plate, and a locking element movable between a deployed and nondeployed position;
varying the speed of the first shaft to select one of the first gear ratio and the second gear ratio, wherein deployment of the locking element of the second coupling assembly is based on the speed of the first shaft;
the step of varying the speed of the first shaft includes reducing the speed of the first shaft until the speed of the first shaft synchronizes with the speed of the second gear ratio; and
moving the locking element of the second coupling assembly to a deployed position after the speed of the first shaft synchronizes with the speed of the second gear ratio.

10. A power transmission method comprising:
providing a first shaft, the first shaft rotatable at a variable rotation speed;
providing a second shaft, the second shaft rotatable at a variable rotation speed;
providing a gear assembly between the first shaft and the second shaft, the gear assembly including at least a first gear ratio and a second gear ratio;

providing a first coupling assembly enabling torque transfer from the first shaft to the second shaft through the first gear ratio, the first coupling assembly including a notch plate, a pocket plate, and a locking element in a deployed position;

providing a second coupling assembly enabling torque transfer from the first shaft to the second shaft through the second gear ratio, the second coupling assembly including a notch plate, a pocket plate, and a locking element movable between a deployed and nondeployed position;

varying the speed of the first shaft to select one of the first gear ratio and the second gear ratio, wherein deployment of the locking element of the second coupling assembly is based on the speed of the first shaft; and the step of varying the speed of the first shaft includes reducing the speed of the first shaft until the speed of the first shaft is below the speed of the second gear ratio and increasing the speed of the first shaft to engage the locking element of the second coupling assembly.

11. The power transmission method of claim 10 wherein:

the step of reducing the speed of the first shaft until the speed of the first shaft is below the speed of the second gear ratio disengages the locking element of the second coupling assembly.

12. A power transmission method comprising:

providing a first shaft, the first shaft rotatable at a variable rotation speed;

providing a second shaft, the second shaft rotatable at a variable rotation speed;

providing a gear assembly, the gear assembly including at least a first gear ratio and a second gear ratio;

providing a first one-way clutch including a forward torque transmitting locking element;

providing a second one-way clutch including a forward torque transmitting locking element;

deploying the forward torque transmitting locking element of the first one-way clutch and enabling torque from the first shaft to the second shaft in the first gear ratio;

reducing the speed of the first shaft until the speed of the first shaft synchronizes with the speed of the second gear ratio; and deploying the forward torque transmitting locking element of the second one-way clutch after the speed of the first shaft synchronizes with the speed of the second gear ratio and enabling torque from the first shaft to the second shaft in the second gear ratio.

13. The power transmission method of claim 12 including the step of:

providing a third one-way clutch including a reverse torque transmitting locking element; and deploying the reverse torque transmitting locking element of the third one-way clutch and enabling torque from the first shaft to the second shaft in the first gear ratio.

14. The power transmission method of claim 13 including the step of:

providing a fourth one-way clutch including a reverse torque transmitting locking element; and deploying the reverse torque transmitting locking element of the fourth one-way clutch and enabling torque from the first shaft to the second shaft in the second gear ratio.

15. The power transmission method of claim 12 including the step of:

increasing the speed of the first shaft to engage the forward torque transmitting locking element of one of the first one-way clutch and the second one-way clutch.

16. The power transmission method of claim 12 including the step of:

enabling no torque in the first gear ratio when the forward torque transmitting locking element of the second one-way clutch is deployed.

17. The power transmission method of claim 12 including the step of:

providing a one-way clutch including a regeneration torque transmitting locking element; and deploying the regeneration torque transmitting locking element of the one-way clutch and enabling torque from the second shaft to the first shaft in the first gear ratio.

18. The power transmission method of claim 12 including the step of:

providing a one-way clutch including a regeneration torque transmitting locking element; and deploying the regeneration torque transmitting locking element of the one-way clutch and enabling torque from the second shaft to the first shaft in the second gear ratio.

19. A power transmission method comprising:

providing a first shaft, the first shaft rotatable at a variable rotation speed;

providing a second shaft, the second shaft rotatable at a variable rotation speed;

providing a gear assembly, the gear assembly including at least a first gear ratio and a second gear ratio;

providing a first one-way clutch including a forward torque transmitting locking element, the first one-way clutch associated with the first gear ratio;

providing a second one-way clutch including a forward torque transmitting locking element, the second one-way clutch associated with the second gear ratio;

enabling torque from the first shaft to the second shaft through the second gear ratio with the forward torque transmitting locking element of the second one-way clutch in a deployed position;

moving the forward torque transmitting locking element of the second one-way clutch in a nondeployed position;

after the forward torque transmitting locking element of the second one-way clutch is in a nondeployed position, changing the rotation speed of the first shaft to engage the forward torque transmitting locking element of the first one-way clutch; and enabling torque from the first shaft to the second shaft through the first gear ratio.

20. The power transmission method of claim 19 including the step of:

reducing the speed of the first shaft below the speed of the second gear ratio wherein the forward torque transmitting locking element of the second one-way clutch moves to the nondeployed position.

21. The power transmission method of claim 19 wherein:

increasing the speed of the first shaft to engage the forward torque transmitting locking element of the first one-way clutch and enabling torque from the first shaft to the second shaft in the first gear ratio.

22. The power transmission method of claim 19 including the step of:

providing a one-way clutch including a reverse torque transmitting locking element, the one-way clutch associated with the first gear ratio; and

deploying the reverse torque transmitting locking element of the one-way clutch and enabling torque from the first shaft to the second shaft in the first gear ratio through the reverse torque transmitting locking element.

23. The power transmission method of claim 19 including the step of:

providing a one-way clutch including a reverse torque transmitting locking element, the one-way clutch associated with the second gear ratio; and deploying the reverse torque transmitting locking element of the one-way clutch and enabling torque from the first shaft to the second shaft in the second gear ratio through the reverse torque transmitting locking element.

24. The power transmission method of claim 19 including the step of:

providing a one-way clutch including a regeneration torque transmitting locking element, the one-way clutch associated with the first gear ratio; and deploying the regeneration torque transmitting locking element of the one-way clutch and enabling torque from the second shaft to the first shaft in the first gear ratio.

25. The power transmission method of claim 19 including the step of:

providing a one-way clutch including a regeneration torque transmitting locking element, the one-way clutch associated with the second gear ratio; and deploying the regeneration torque transmitting locking element of the one-way clutch and enabling torque from the second shaft to the first shaft in the second gear ratio.

26. A power transmission system comprising:

a first shaft rotatable at a variable speed;

a second shaft rotatable at a variable speed;

a gear assembly between the first shaft and the second shaft, the gear assembly including at least a first gear ratio and a second gear ratio;

a first coupling assembly enabling torque transfer from the first shaft to the second shaft in the first gear ratio, the first coupling assembly including a notch plate, a pocket plate, and a locking element in a deployed position;

a second coupling assembly enabling torque transfer from the first shaft to the second shaft in the second gear ratio, the second coupling assembly including a notch plate, a pocket plate, and a locking element movable between a deployed and nondeployed position; and an actuator operative to move the locking element of the second coupling assembly based on the speed of the first shaft without a change of direction of the first shaft relative to the speed of the second gear ratio to enable torque from the first shaft to the second shaft in either the first gear ratio or the second gear ratio.

27. The power transmission system of claim 26 wherein:

the locking element of the first coupling assembly in the deployed position is a forward torque transmitting element; and the first coupling assembly includes a reverse torque transmitting locking element movable between a deployed position and a nondeployed position.

28. The power transmission system of claim 26 wherein:

the locking element movable between a deployed position and a nondeployed position of the second coupling assembly is a forward torque transmitting element; and

the second coupling assembly includes a reverse torque transmitting locking element movable between a deployed position and a nondeployed position.

29. The power transmission system of claim 26 wherein:

the locking element of the first coupling assembly in the deployed position is a forward torque transmitting element;

the first coupling assembly includes a reverse torque transmitting locking element movable between a deployed position and a nondeployed position;

the locking element of the second coupling assembly movable between a deployed position and a nondeployed position is a forward torque transmitting element; and the second coupling assembly includes a reverse torque transmitting locking element movable between a deployed position and a nondeployed position.

30. The power transmission system of claim 26 including:

the locking element of the first coupling assembly movable between the deployed position and a nondeployed position.

31. The power transmission system of claim 26 wherein:

the actuator moves the locking element of the second coupling assembly to a deployed position after the speed of the first shaft synchronizes with the speed of the second gear ratio.

32. The power transmission system of claim 26 including:

reducing the speed of the first shaft until the speed of the first shaft synchronizes with the speed of the second gear ratio; and moving the locking element of the second coupling assembly to a deployed position after the speed of the first shaft synchronizes with the speed of the second gear ratio.

33. A power transmission system comprising:

a first shaft rotatable at a variable speed;

a second shaft rotatable at a variable speed;

a gear assembly between the first shaft and the second shaft, the gear assembly including at least a first gear ratio and a second gear ratio;

a first coupling assembly enabling torque transfer from the first shaft to the second shaft in the first gear ratio, the first coupling assembly including a notch plate, a pocket plate, and a locking element in a deployed position;

a second coupling assembly enabling torque transfer from the first shaft to the second shaft in the second gear ratio, the second coupling assembly including a notch plate, a pocket plate, and a locking element movable between a deployed and nondeployed position;

enabling torque transfer from the first shaft to the second shaft in one of the first gear ratio and the second gear ratio based on the speed of the first shaft; and the locking element of the second coupling assembly moves between the deployed and nondeployed position based on the speed of the first shaft and the speed of the second gear ratio.

34. A power transmission method comprising:

providing a first shaft, the first shaft rotatable at a variable rotation speed;

providing a second shaft, the second shaft rotatable at a variable rotation speed;

providing a gear assembly, the gear assembly including at least a first gear ratio and a second gear ratio;

providing a first one-way clutch including a torque transmitting locking element, the first one-way clutch associated with the first gear ratio;

providing a second one-way clutch including a torque transmitting locking element, the second one-way clutch associated with second gear ratio;

deploying the torque transmitting locking element of the first one-way clutch and enabling torque from the first shaft to the second shaft in the first gear ratio;

changing the speed of the first shaft without changing the direction of rotation of the first shaft to synchronize the speed of the first shaft with the speed of the second gear ratio; and deploying the torque transmitting locking element of the second one-way clutch after the speed of the first shaft synchronizes with the speed of the second gear ratio and enabling torque from the first shaft to the second shaft in the second gear ratio.

35. A power transmission method comprising:

providing a first shaft, the first shaft rotatable at a variable rotation speed;

providing a second shaft, the second shaft rotatable at a variable rotation speed;

providing a gear assembly, the gear assembly including at least a first gear ratio and a second gear ratio;

providing a first one-way clutch including a torque transmitting locking element, the first one-way clutch associated with the first gear ratio;

providing a second one-way clutch including a torque transmitting locking element, the second one-way clutch associated with the second gear ratio;

enabling torque from the first shaft to the second shaft through the second gear ratio with the torque transmitting locking element of the second one-way clutch in a deployed position;

moving the torque transmitting locking element of the second one-way clutch to a nondeployed position; and after the torque transmitting locking element of the second one-way clutch is in a nondeployed position, changing the rotation speed of the first shaft without changing the direction of the first shaft to engage the torque transmitting locking element of the first one-way clutch enabling torque from the first shaft to the second shaft through the first gear ratio.

* * * * *